(12) United States Patent
Gray et al.

(10) Patent No.: US 8,711,105 B2
(45) Date of Patent: Apr. 29, 2014

(54) TOUCHSCREEN WITH EXTENDED CONDUCTIVE PATTERN

(75) Inventors: Patrick T. Gray, Cedar Park, TX (US); Sadao Yamamoto, Saitama (JP)

(73) Assignee: Wacom Co., Ltd., Tokyo (JP)

( * ) Notice: Subject to any disclaimer, the term of this patent is extended or adjusted under 35 U.S.C. 154(b) by 688 days.

(21) Appl. No.: 12/407,646

(22) Filed: Mar. 19, 2009

(65) Prior Publication Data
US 2010/0045614 A1 Feb. 25, 2010

Related U.S. Application Data

(60) Provisional application No. 61/090,892, filed on Aug. 21, 2008, provisional application No. 61/092,914, filed on Aug. 29, 2008.

(51) Int. Cl.
*G06F 3/044* (2006.01)
(52) U.S. Cl.
USPC .......................................................... 345/173
(58) Field of Classification Search
None
See application file for complete search history.

(56) References Cited

U.S. PATENT DOCUMENTS

| | | |
|---|---|---|
| 3,921,167 A | 11/1975 | Fox |
| 3,971,013 A | 7/1976 | Challoner et al. |
| 4,125,783 A | 11/1978 | Sefton |
| 4,157,539 A | 6/1979 | Hunts et al. |
| 4,221,975 A | 9/1980 | Ledniczki et al. |
| 4,237,421 A | 12/1980 | Waldon |
| 4,264,903 A | 4/1981 | Bigelow |
| 4,288,786 A | 9/1981 | Ledniczki et al. |
| 4,290,052 A | 9/1981 | Eichelberger et al. |
| 4,293,987 A | 10/1981 | Gottbreht et al. |
| 4,367,385 A | 1/1983 | Frame |
| 4,394,643 A | 7/1983 | Williams |
| 4,405,918 A | 9/1983 | Wall et al. |
| 4,413,252 A | 11/1983 | Tyler et al. |
| 4,550,221 A | 10/1985 | Mabusth |
| 4,561,002 A | 12/1985 | Chin |
| 4,639,720 A | 1/1987 | Rympalski et al. |
| 4,728,931 A | 3/1988 | Linder et al. |
| 4,743,895 A | 5/1988 | Alexander |
| 5,078,220 A | 1/1992 | Briefer |
| 5,087,825 A | 2/1992 | Ingraham |
| 5,153,572 A | 10/1992 | Caldwell et al. |
| 5,189,417 A | 2/1993 | Caldwell et al. |

(Continued)

FOREIGN PATENT DOCUMENTS

CN 1945516 A 4/2007

*Primary Examiner* — Wayne Young
*Assistant Examiner* — Mark Fischer
(74) *Attorney, Agent, or Firm* — Garlick & Markison; Holly L. Rudnick

(57) ABSTRACT

Extended touchscreen pattern. A conductive pattern implemented within a touchscreen (e.g., using indium tin oxide (ITO) such as may be deposited on a substrate composed of polyester or some other material) provides paths for signals traveling through the touchscreen. By monitoring these signal in accordance with some means (e.g., cross point detection, zone detection, etc.) an estimate may be made as to a location of user's interaction with the touchscreen (e.g., finger or stylus touching of the touchscreen). The conductive pattern includes a number of conductors aligned in various directions (e.g., row and column conductors) across the touchscreen, and they may be co-planar or separated by a dielectric material. A conductor aligned in one direction includes one or more extended areas that complementarily align with a conductor aligned in another direction. The extended areas of one conductor may be viewed as filling voids (e.g., holes, notches, etc.) of another conductor.

31 Claims, 23 Drawing Sheets

(56) References Cited

U.S. PATENT DOCUMENTS

| | | | |
|---|---|---|---|
| 5,305,017 A | 4/1994 | Gerpheide | |
| 5,463,388 A * | 10/1995 | Boie et al. | 341/33 |
| 5,508,700 A | 4/1996 | Taylor et al. | |
| 5,526,294 A | 6/1996 | Ono et al. | |
| 5,565,658 A | 10/1996 | Gerpheide et al. | |
| 5,572,205 A | 11/1996 | Caldwell et al. | |
| 5,760,715 A | 6/1998 | Senk et al. | |
| 5,933,102 A | 8/1999 | Miller et al. | |
| 5,945,980 A | 8/1999 | Moissev et al. | |
| 6,188,391 B1 | 2/2001 | Seely et al. | |
| 6,239,788 B1 | 5/2001 | Nohno et al. | |
| 6,768,484 B2 * | 7/2004 | Sano et al. | 345/173 |
| 7,129,935 B2 * | 10/2006 | Mackey | 345/174 |
| 7,202,859 B1 * | 4/2007 | Speck et al. | 345/174 |
| 7,361,860 B2 * | 4/2008 | Caldwell | 200/600 |
| 7,688,080 B2 * | 3/2010 | Golovchenko et al. | 324/660 |
| 7,821,502 B2 | 10/2010 | Hristov | |
| 7,851,720 B2 * | 12/2010 | Raunig | 200/600 |
| 7,864,160 B2 * | 1/2011 | Geaghan et al. | 345/173 |
| 2007/0008299 A1 * | 1/2007 | Hristov | 345/173 |
| 2007/0062739 A1 * | 3/2007 | Philipp et al. | 178/18.06 |
| 2009/0194344 A1 * | 8/2009 | Harley et al. | 178/18.06 |
| 2009/0273570 A1 * | 11/2009 | Degner et al. | 345/173 |

* cited by examiner

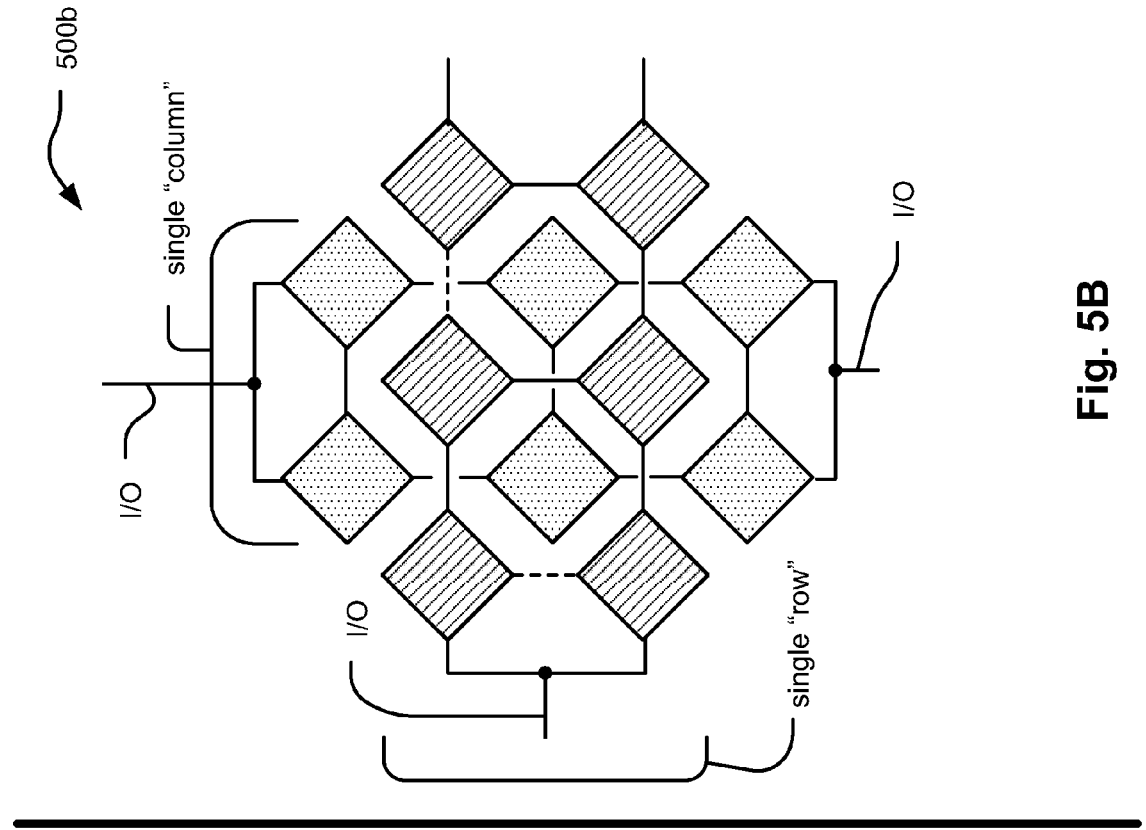
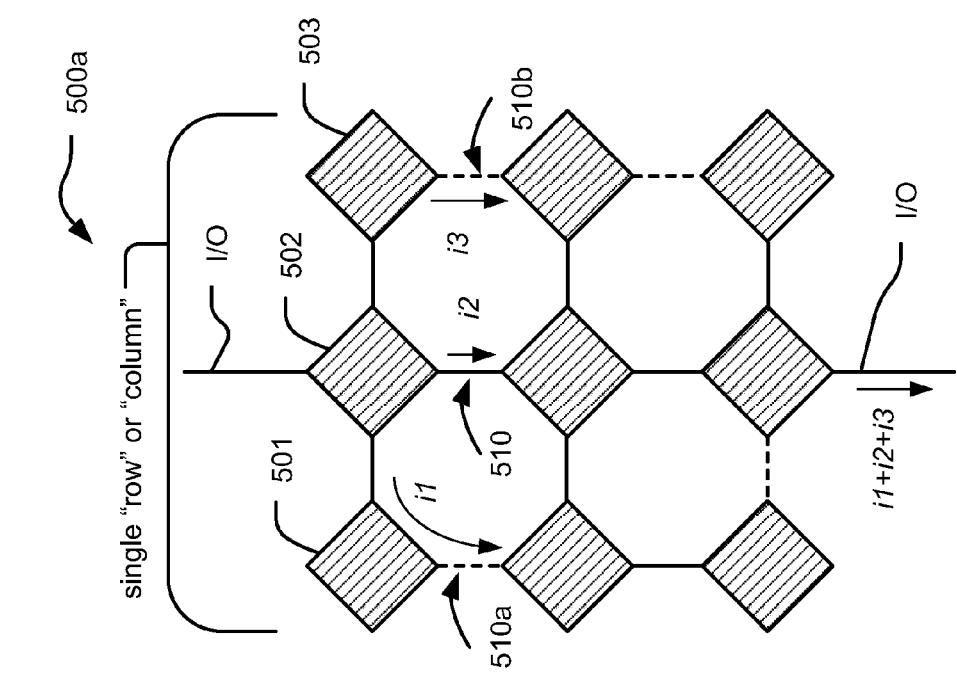
Fig. 5B
Fig. 5A

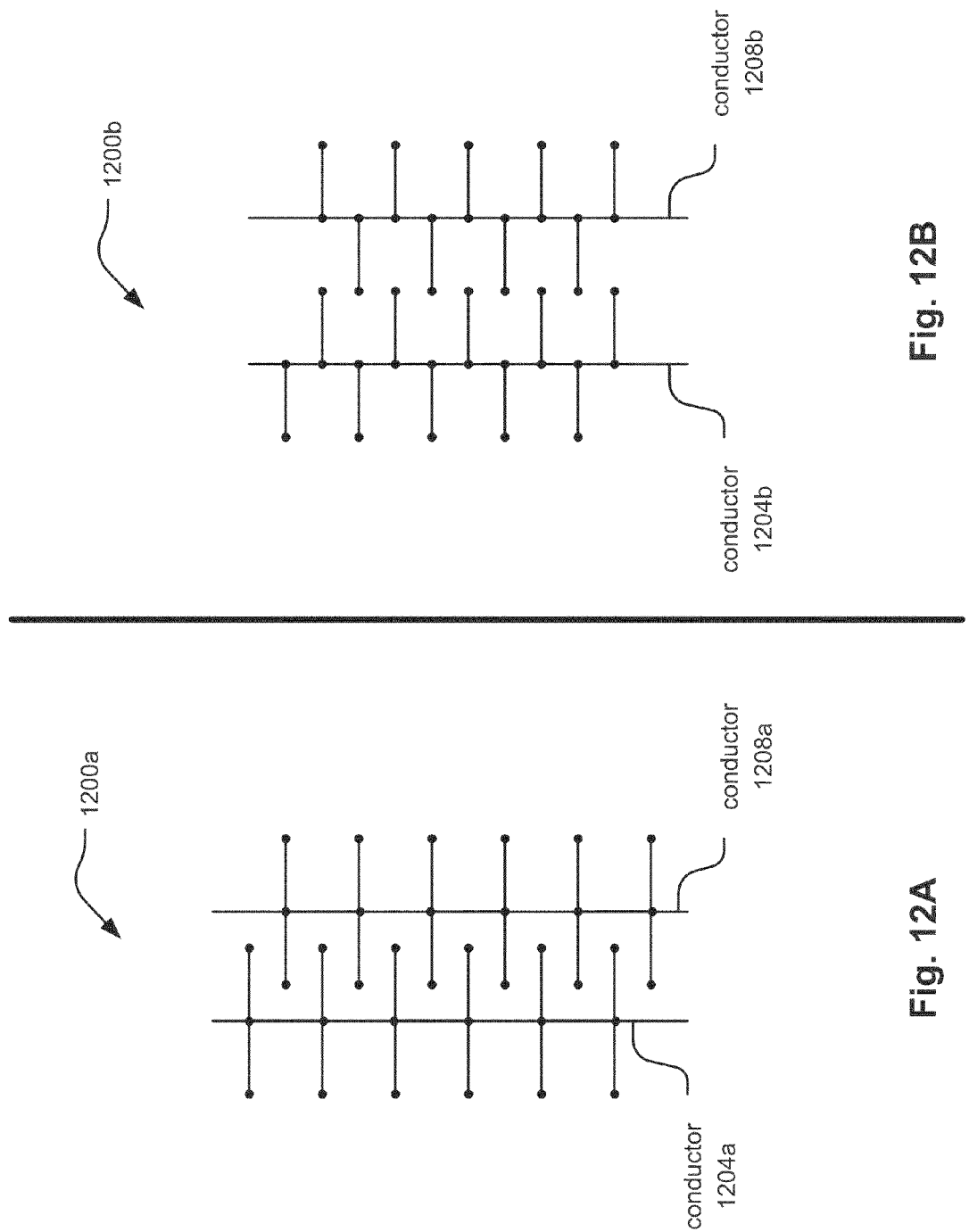

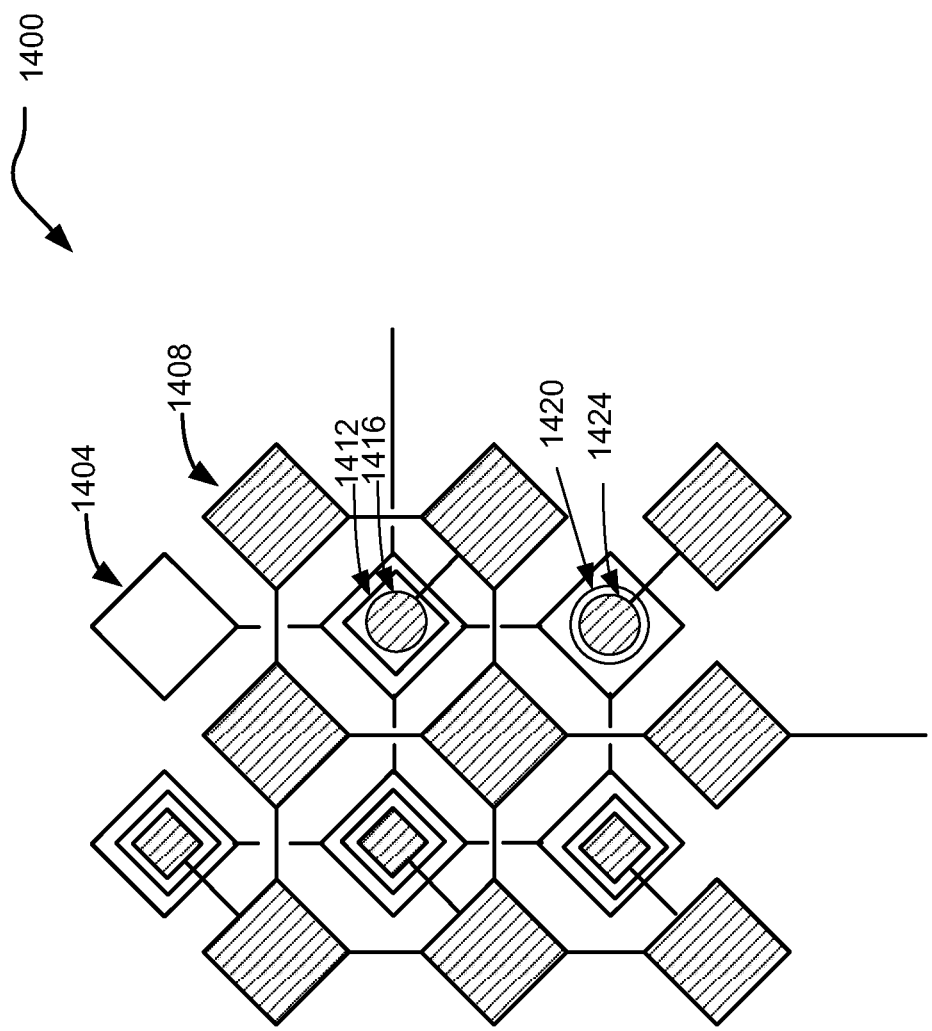

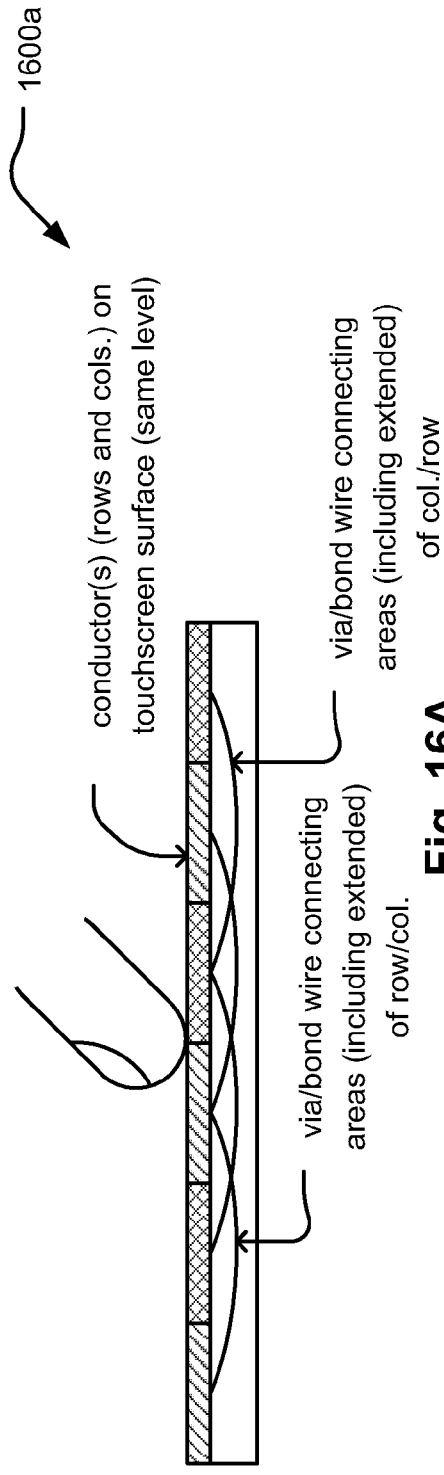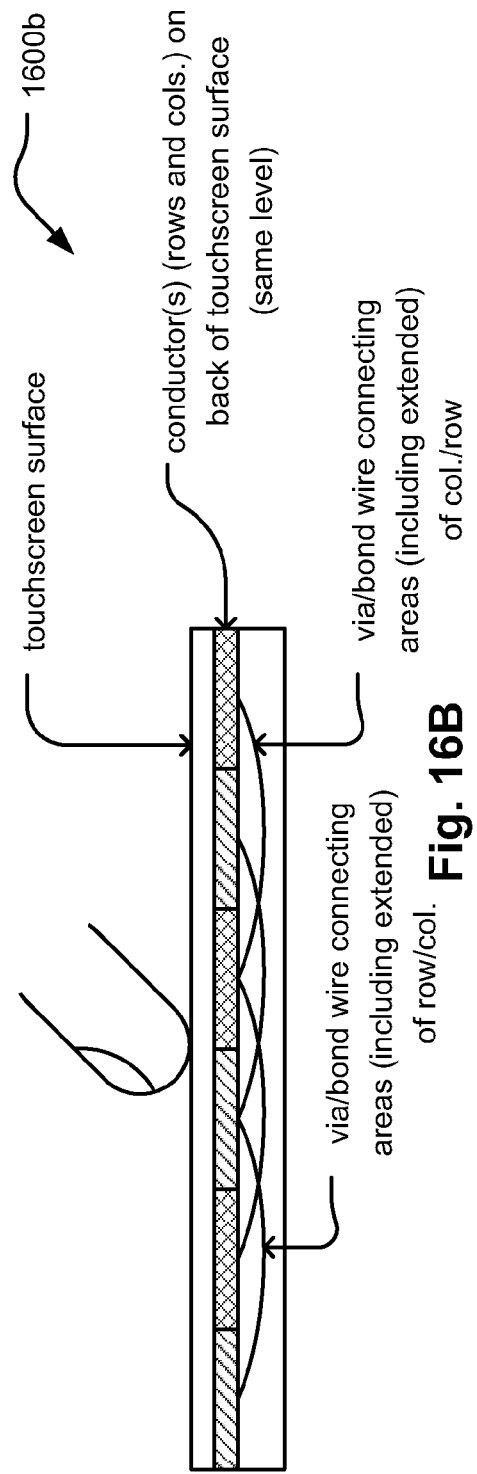

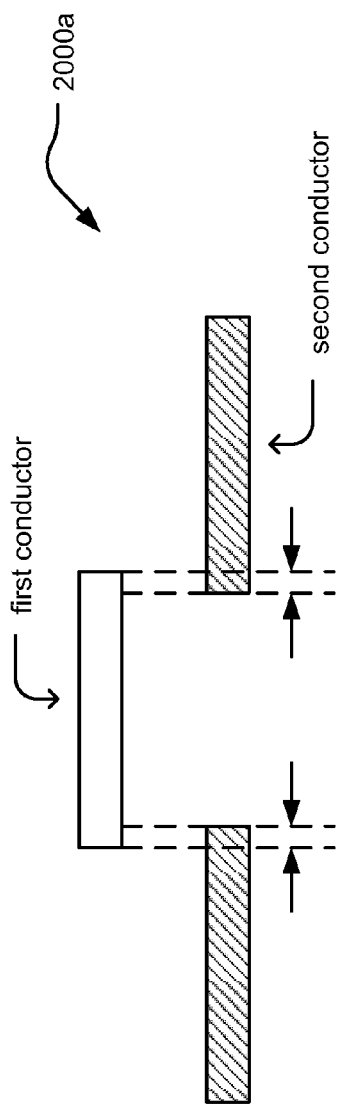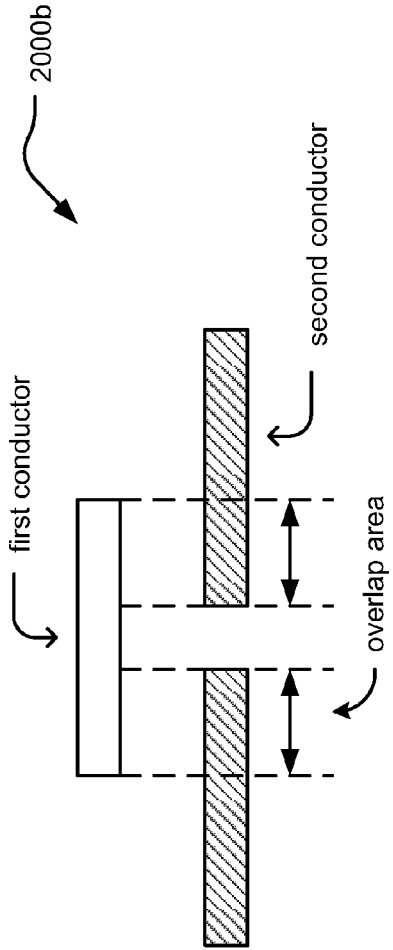

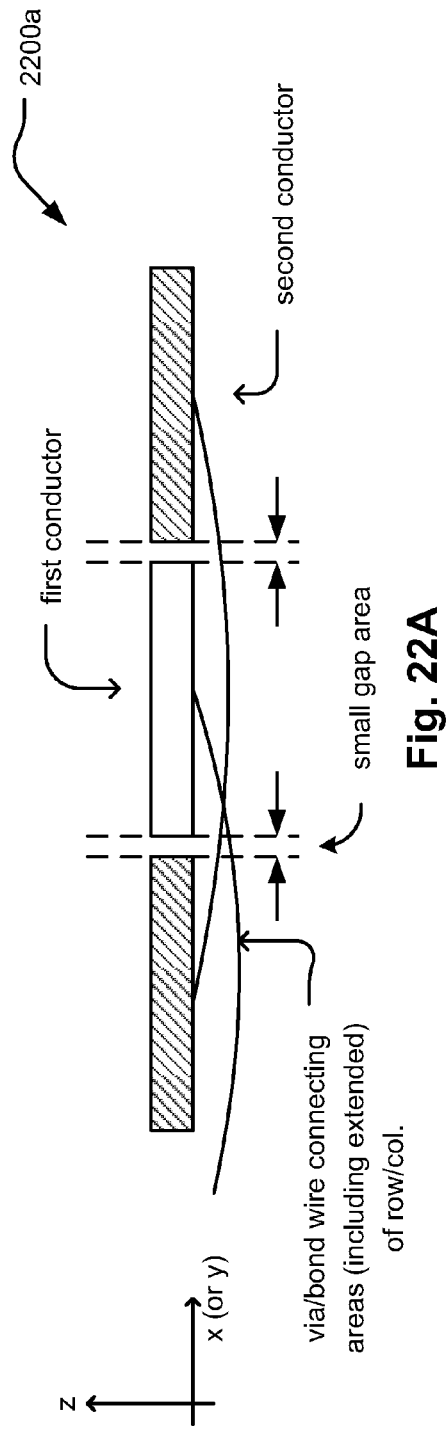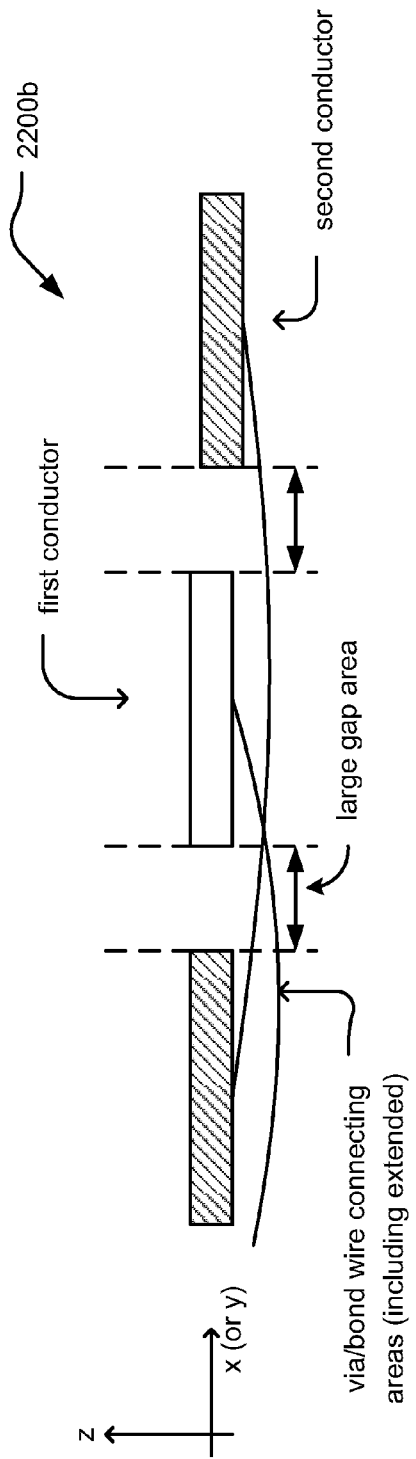

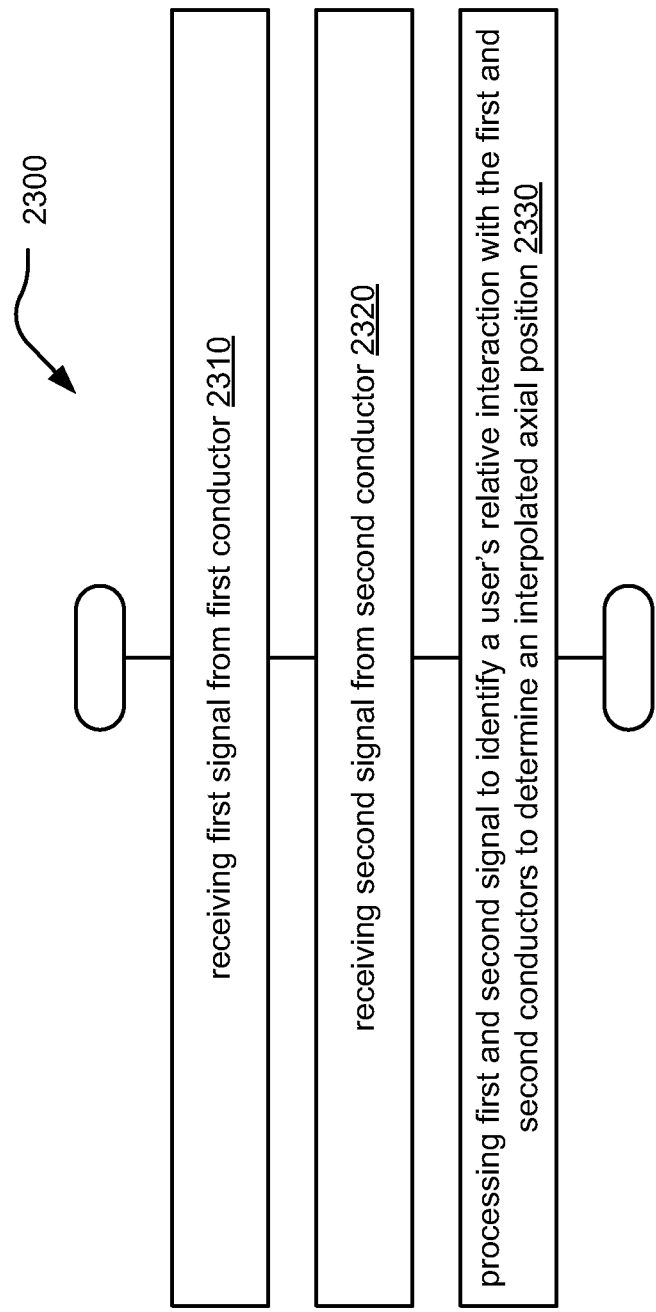

TOUCHSCREEN WITH EXTENDED CONDUCTIVE PATTERN

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 61/090,892, entitled "Extended touchscreen pattern," filed Aug. 21, 2008, pending.

2. U.S. Provisional Application Ser. No. 61/092,914, entitled "Meshed touchscreen pattern," filed Aug. 29, 2008, pending.

Incorporation by Reference

The following U.S. Utility Patent Application, being filed concurrently, is hereby incorporated herein by reference in its entirety and is made part of the present U.S. Utility Patent Application for all purposes:

1. U.S. Utility Application Ser. No. 12/407,661, entitled "Meshed touchscreen pattern," filed Mar. 19, 2009, pending.

BACKGROUND OF THE INVENTION

1. Technical Field of the Invention

The invention relates generally to devices that include a man to machine interface (MMI) implemented using a touchscreen; and, more particularly, it relates to conductive patterns employed within such touchscreens.

2. Description of Related Art

Touchscreen technology is relatively new in the world of displays for stationary and mobile devices. Traditionally, an underlying layer of lines that can sense a user's touch are arranged in a patterned manner and are monitored iteratively for a signal that suggests a coordinate of a point that is touched. Initial systems were designed to detect a single touch. A new emphasis, however, is to develop touchscreen technology that can accurately detect multiple simultaneous touches.

Some current technology for multi-finger touch works by charging and discharging a voltage on a row or column of conductor and measuring the change in the charge when touched. This technology includes all stray capacitance in the measurement. One standard arrangement for the lines that detect touch is to use rows and columns of the sensing lines that include a series of diamond shaped areas connected end to end. The row and column lines are arranged so that the diamonds do not overlap each other, even if on different layers, and the rows and columns are placed so that they only overlap at the intersections of connection lines between the diamond shaped areas. The overlapping area of the intersection of the connection lines is kept very small to reduce capacitance and, therefore, the capacitive effects of the overlapped areas. The capacitive effects of the overlapped areas can be much larger than any other "noise" or "unusable signal" in the system.

The original touchscreen devices were small thereby resulting in the number of lines used for sensing touch being manageable given the iterative manner in which such lines are scanned. Traditionally, a cross point connection resulting from a touch resulted in a signal produced at a sensing line arranged horizontally would appear on a sensing line arranged vertically, or vice versa. Thus, if there were 10 horizontal lines (rows) and 10 vertical lines (columns), 100 possible points have to be scanned to determine whether a touch occurred. For a small screen, the diamond shaped areas could be made small so that a finger might touch more than one diamond at a time to assist in the accurate determination of the touch location.

As screens increase in size, however, the shaped areas for detecting touch tend to increase in size also to avoid or minimize an increase in a number of lines (vertical or horizontal) that must be monitored/scanned to detect a touch. For example, if a four inch monitor has twenty vertically arranged lines and 20 horizontally arranged lines, four hundred possible touch locations require monitoring on a repetitive basis (e.g., 50 times per second) for a cross point monitoring scheme. It is easy to see that if the screen size increases to a 12 square inch area, and the arrangement of the lines and size of the shaped areas remains constant, the number of possible touch locations increases to 3600. If the scan rate is 50 times per second, 2000 scan points are performed per second for a 4" touchscreen, and 18,000 scan points are performed per second for the 12" touchscreen. Accordingly, designers have tended to increase, perhaps proportionally, the size of the shaped areas to match the increase in screen size so as to not increase the number of possible touch locations that require monitoring.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 5A illustrates an embodiment of a column or row of a conductive pattern, as employed in a touchscreen, that includes multiple areas.

FIG. 5B illustrates an embodiment of complementarily aligned columns and rows of a conductive pattern as employed in a touchscreen.

FIG. 12A illustrates an embodiment of multiple columns and rows of a conductive pattern, as employed in a touchscreen, that include various extended areas.

FIG. 12B illustrates another embodiment of multiple columns and rows of a conductive pattern, as employed in a touchscreen, that include various extended areas.

FIG. 14 illustrates an embodiment of multiple columns and rows of a conductive pattern, as employed in a touchscreen, that include various extended areas of various shapes.

FIG. 16A illustrates an alternative embodiment of placement of conductive patterns within a touchscreen.

FIG. 16B illustrates an alternative embodiment of placement of conductive patterns within a touchscreen.

FIGS. 20A and FIG. 20B illustrate embodiments of substantially complementary and substantially non-complementary overlap of conductors within a conductive pattern, respectively.

FIGS. 22A and FIG. 22B illustrate alternative embodiments of substantially complementary and substantially non-complementary overlap of conductors within a conductive pattern, respectively, that are implemented on a same level (or layer) within a touchscreen.

FIG. 23 illustrates an embodiment of a method for determining an interpolated axial position.

DETAILED DESCRIPTION OF THE INVENTION

Figure 1:
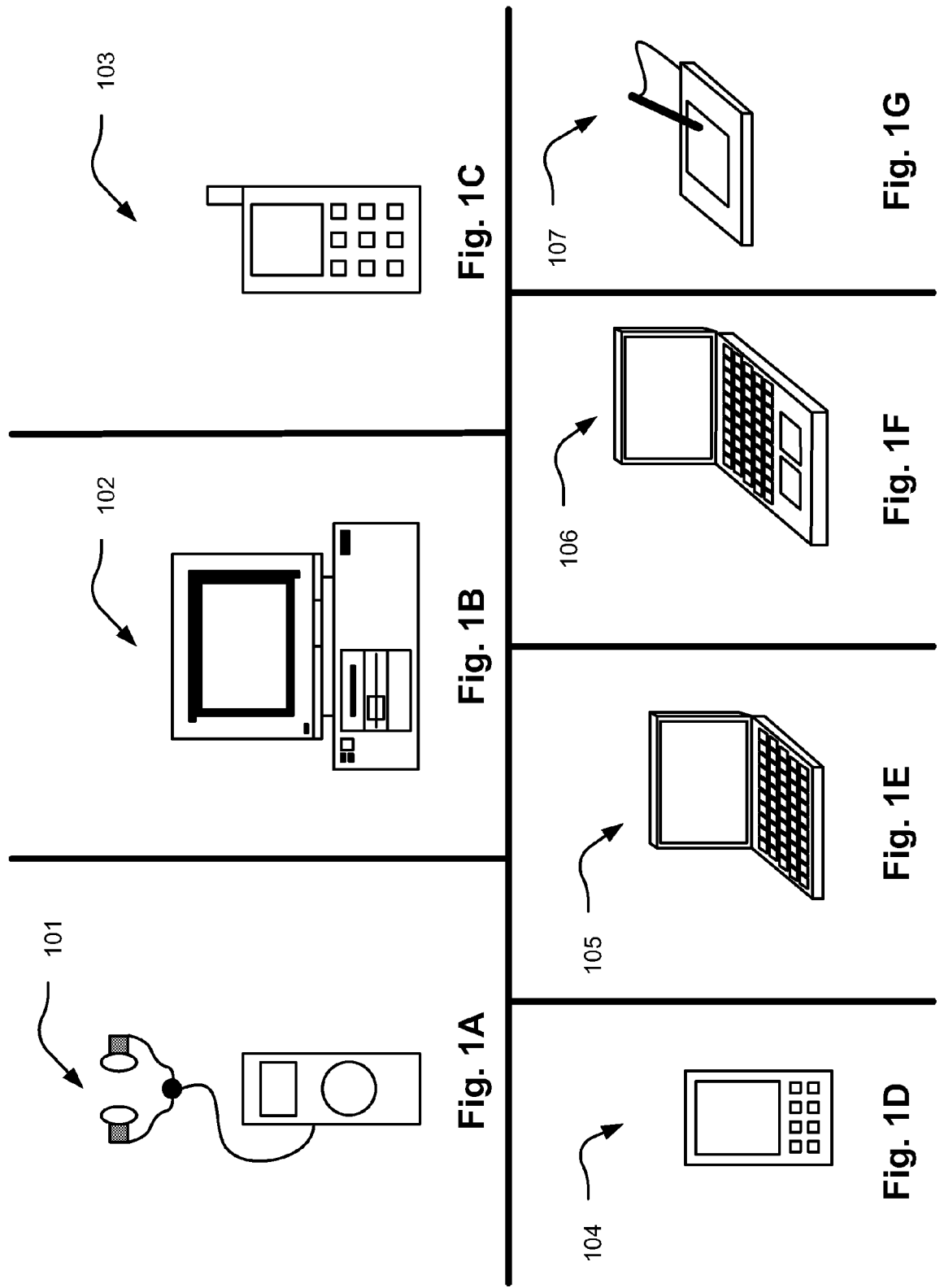
FIG. 1A illustrates an embodiment of a handheld media unit.
FIG. 1B illustrates an embodiment of a computer.
FIG. 1C illustrates an embodiment of a wireless communication device.
FIG. 1D illustrates an embodiment of a personal digital assistant (PDA).
FIG. 1E illustrates an embodiment of a laptop computer.
FIG. 1F illustrates an embodiment of a laptop computer with an integrated touchscreen (e.g., a tablet) on the palm rest.
FIG. 1G illustrates an embodiment of an electronic tablet.

Devices that include some form of man to machine interface (MMI) are employed in a wide variety of contexts. There are a variety of types of MMIs that allow a user to provide information to and retrieve information from a device (e.g., keyboard of a device such as a computer, an interactive panel/touchscreen on any number of devices such as a self-service gas pump, a self-service check in terminal at an airport, etc.). Some MMIs that are implemented using touchscreens in which a user interacts with the touchscreen using a finger or some other implement (e.g., a stylus or other means by which locations on the touchscreen are selected by the user) are increasing in their prevalence. Any of a wide variety of devices may include a MMI having at least a portion of which is implemented with a touchscreen.

FIG. 1A illustrates an embodiment of a handheld unit 101. A handheld media unit 101 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format. Historically, such handheld media units were primarily employed for storage and playback of audio media; however, such a handheld media unit 101 may be employed for storage and playback of virtual any media (e.g., audio media, video media, photographic media, etc.). Moreover, such a handheld media unit 101 may also include other functionality such as integrated communication means.

To allow a user to provide commands to and select certain functions via the touchscreen of the handheld media unit 101, the handheld media unit 101 includes at least one touchscreen. Certain selections on the touchscreen may be made by a user's finger or other bodily portion; alternatively, the handheld media unit 101 may include some user-provided implement (e.g., a stylus or other implement) that the user may employ to provide commands to and select certain functions via the touchscreen of the handheld media unit 101.

FIG. 1B illustrates an embodiment of a computer 102. The computer 102 can be a desktop computer, or an enterprise storage devices such a server, of a host computer that is attached to a storage array such as a redundant array of independent disks (RAID) array, storage router, edge router, storage switch and/or storage director.

The actual monitor of the computer 102 may have touchscreen capability (or only a portion of the monitor may have touchscreen capability). Alternatively, a peripheral device of the computer 102 (e.g., a keyboard or other peripheral device) may include a touchscreen thereon. A user may provide commands to and select certain functions via the touchscreen of the computer 102. Certain selections on the touchscreen may be made by a user's finger or other bodily portion; alternatively, the computer 102 may include some user-provided implement (e.g., a stylus or other implement) that the user may employ to provide commands to and select certain functions via the touchscreen of the computer 102.

FIG. 1C illustrates an embodiment of a wireless communication device 103. Wireless communication device 103 is capable of communicating via a wireless network such as a cellular, personal communications service (PCS), general packet radio service (GPRS), global system for mobile communications (GSM), and integrated digital enhanced network (iDEN) or other wireless communications network capable of sending and receiving wireless communications. Further, wireless communication device 103 is capable to communicate via the Internet to access email, download content, access websites, and provide steaming audio and/or video programming. In this fashion, wireless communication device 103 can place and receive calls, text messages such as emails, short message service (SMS) messages, pages and other data messages that can include attachments such as documents, audio files, video files, images and other graphics.

The wireless communication device 103 includes a touchscreen that allows a user of the communication device 103 to provide commands to and select certain functions of the communication device 103. Certain selections on the touchscreen may be made by a user's finger or other bodily portion; alternatively, the communication device 103 may include some user-provided implement (e.g., a stylus or other implement) that the user may employ to provide commands to and select certain functions via the touchscreen of the communication device 103.

FIG. 1D illustrates an embodiment of a personal digital assistant (PDA) 104. The PDA 104 includes a touchscreen that allows a user of the PDA 104 to provide commands to and select certain functions of the PDA 104. Certain selections on the touchscreen may be made by a user's finger or other bodily portion; alternatively, the PDA 104 may include some user-provided implement (e.g., a stylus or other implement) that the user may employ to provide commands to and select certain functions via the touchscreen of the PDA 104.

FIG. 1E illustrates an embodiment of a laptop computer 105. The actual monitor of the laptop computer 105 may have touchscreen capability (or only a portion of the monitor may have touchscreen capability). Alternatively, a peripheral device of the laptop computer 105 (e.g., an external keyboard or other peripheral device) may include a touchscreen thereon. A user may provide commands to and select certain functions via the touchscreen of the laptop computer 105. Certain selections on the touchscreen may be made by a user's finger or other bodily portion; alternatively, the laptop computer 105 may include some user-provided implement (e.g., a stylus or other implement) that the user may employ to provide commands to and select certain functions via the touchscreen of the laptop computer 105.

FIG. 1F illustrates an embodiment of a laptop computer 106 with an integrated touchscreen (e.g., a tablet) on the palm rest. A user may provide commands to and select certain functions via the integrated touchscreen (e.g., tablet) of the laptop computer 106. Certain selections on the integrated touchscreen (e.g., tablet) may be made by a user's finger or other bodily portion; alternatively, the laptop computer 106 may include some user-provided implement (e.g., a stylus or other implement) that the user may employ to provide commands to and select certain functions via the integrated touchscreen (e.g., tablet) of the laptop computer 106.

FIG. 1G illustrates an embodiment of an electronic tablet 107. The electronic tablet 107 includes a stylus that a user employs to provide commands to and select certain functions of the electronic tablet 107. The electronic tablet 107 may also include integrated computing capability, storage means, etc. that allow the electronic tablet 107 to operate, at least in some respects, like a computer or laptop computer. However, the electronic tablet 107 includes no integrated keyboard. It is noted, however, that a virtual keyboard may be displayed on the electronic tablet 107, and buttons thereof may be selected by the stylus that the user employs. Of course, it is noted that alternatively, an embodiment such as an electronic tablet may include no stylus and certain selections on such an electronic tablet may be made by a user's finger or other bodily portion.

As can be seen, a wide variety of devices may employ a touchscreen to effectuate at least one part of an MMI thereto. There are various means by which a user's interaction with such a touchscreen can be detected.

Figure 2:
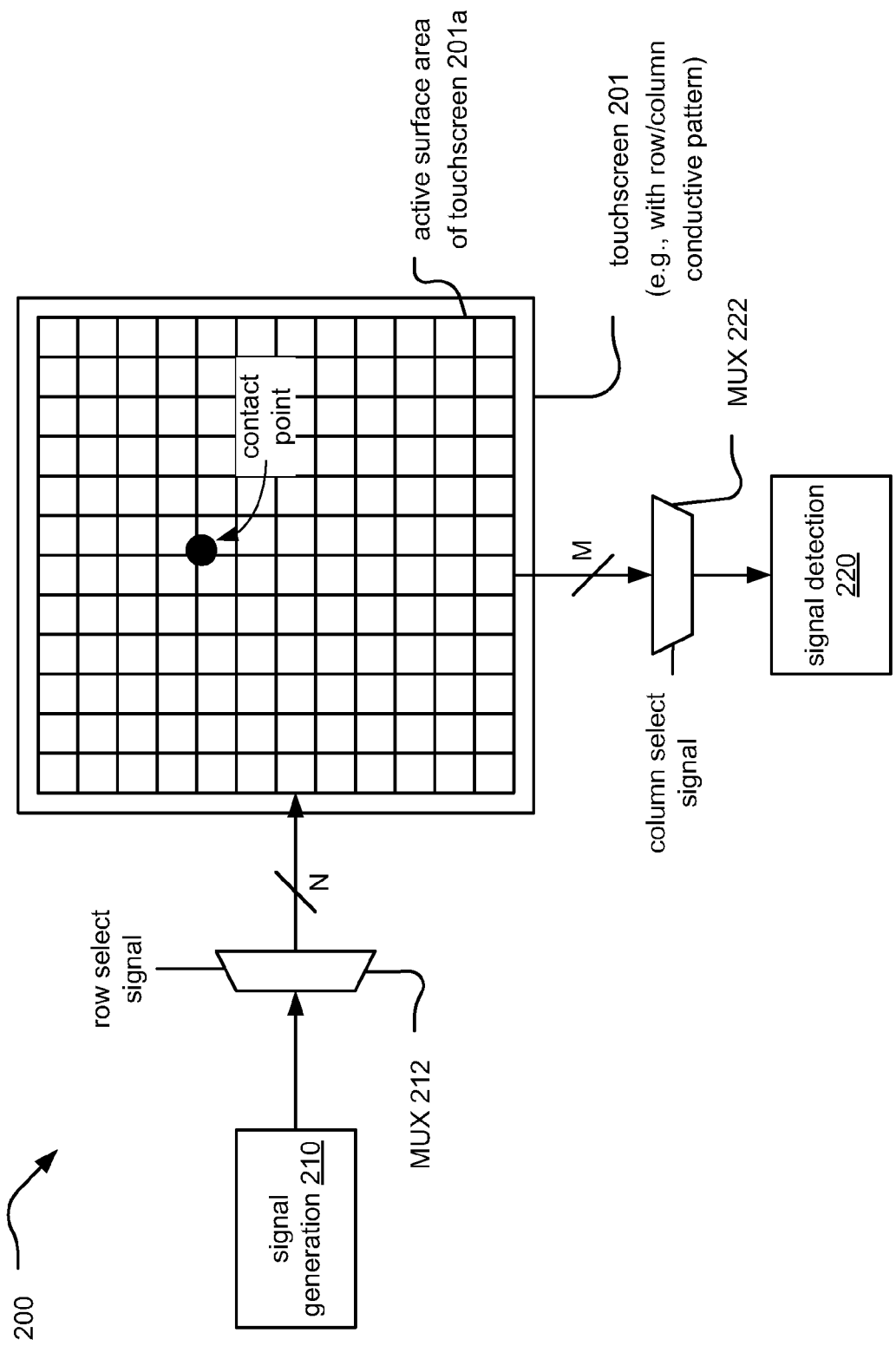
FIG. 2 illustrates an embodiment of a touchscreen in which cross point detection is performed to location a user's interaction with the touchscreen.

FIG. 2 illustrates an embodiment 200 of a touchscreen 201 in which cross point detection is performed to locate a user's interaction with the touchscreen. In some embodiments, an active surface area of the touchscreen 201 a covers a slightly smaller portion of the touchscreen 200. For example, a border or perimeter around the active surface area of the touchscreen 201a may be employed.

A number of conductors forming rows and columns of a conductive pattern (e.g., indium tin oxide (ITO)) may be deposited on a substrate composed of polyester or other material on one or more layers of the touchscreen. In some embodiments, a first portion of the conductive pattern (e.g., the columns) is disposed on a first layer, and a second portion of the conductive pattern (e.g., the rows) is disposed on a second layer; the first and second layer may be separated by a dielectric material in some embodiments. Alternatively, the row and column oriented conductors may be disposed on the same layer and may utilize known techniques for connecting elements including traces, vias, bond wires, etc. to ensure that the first portion of conductive pattern (e.g., the columns) do not directly come into contact with the second portion of conductive pattern (e.g., the rows). While this and other embodiments depict rows and columns that are inherently perpendicular to one another, there may be other embodiments in which a plurality of first conductors are aligned in a first direction and a plurality of second conductors are aligned in a second direction that is different to the first direction wherein there is no particular requirements for the orientation of the first and second directions. In other words, the conductors need not necessarily be perpendicular to one another (though they may be perpendicular in one referred embodiment). Moreover, the conductors need not be oriented in vertical and horizontal axis though such orientation is shown in the described embodiments.

In the embodiment 200, a signal generation module 210 provides a signal to a multiplexer (MUX) 212 that selectively applies the signal from the signal generation module 210 to one on "N" first conductors (e.g., to a selected row) of the conductive pattern. The MUX 212 ensures that the signal is applied, at different times, to each of the first conductors (e.g., to each of the rows) of the conductive pattern based on a row selection signal generated by row selection circuitry (e.g., logic circuitry in one embodiment).

A signal detection module 220 receives a signal from MUX 222 that is selectively coupled to each of the second conductors (e.g., to selected columns) of the conductive pattern. The MUX 222 ensures that the signal detection module 220 samples and detects (or tries to detect) a signal from each of the "M" second conductors (e.g., to selected columns) of the conductive pattern. In one embodiment, the signal that is produced into a first conductor is coupled to a second conductor at a touch location and is received by the signal detection module.

In an alternate embodiment, a user's touch increases capacitance between first and second conductors at a touch location thereby increasing an input signal magnitude at the conductor to which the signal is produced and an output signal magnitude (due to the increased capacitance) that is detected by the signal detection module at the second conductor(s) affected by the user's touch at the touch location. Thus, a direct coupling does not occur between the first and second conductors in this alternate embodiment. Generally, by applying a signal to each row and testing for a signal at each column of the touchscreen, a touch can be detected when a user interacts with the touchscreen (e.g., as shown by contact point) with a reasonably high degree of certainty as to where the user has interacted with the touchscreen (e.g., as limited by the granularity and/or proximity of the rows and columns).

For example, when a user does interact with the touchscreen, the increased capacitance will be introduced in the conductive pattern corresponding to the location of the user's interaction. This increased capacitance introduces a reduced impedance path due to the increased capacitance between a row and column (e.g., first and second conductors) as caused by the user or the implement (e.g., stylus) employed by the user. Because capacitive reactance, $Z_C$, scales inversely with capacitance (i.e., because $Z_C=1/j\omega C$, where $\omega$ is frequency in radians per second, and C is capacitance in farads), the impedance decreases as capacitance increases with a user's touch at the touch location. Therefore, by detecting a change in a signal provided to a particular row and detected at a particular column, an estimate of the location of the user's interaction with the touchscreen may be made.

Figure 3:
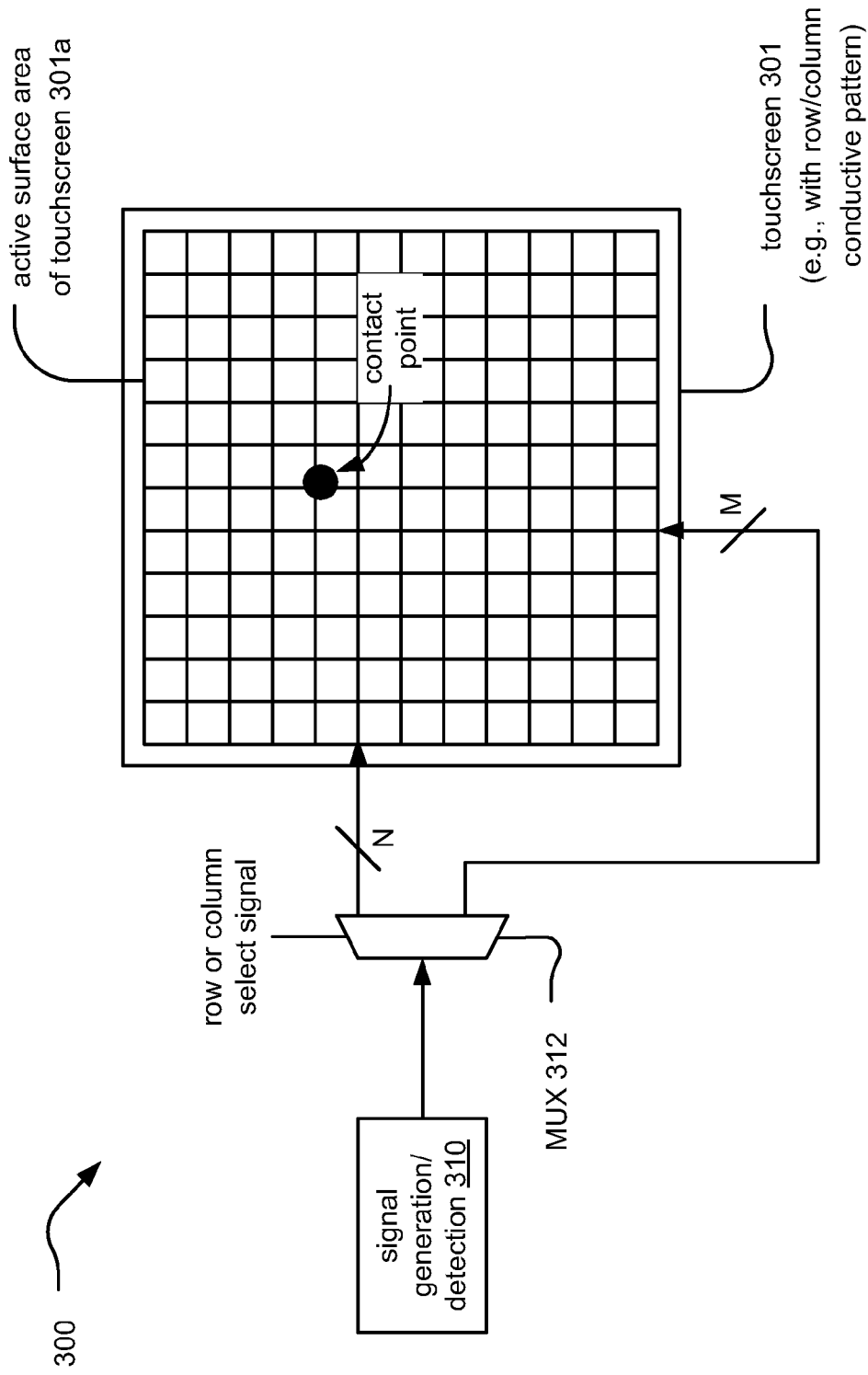
FIG. 3 illustrates an embodiment of a touchscreen in which zone detection is performed to location a user's interaction with the touchscreen.

FIG. 3 illustrates an embodiment 300 of a touchscreen 301 in which zone detection is performed to location a user's interaction with the touchscreen. As with the previous embodiment, in some embodiments, an active surface area of the touchscreen 301a covers a slightly smaller portion of the touchscreen 300. For example, a border or perimeter around the active surface area of the touchscreen 301a may be employed.

This embodiment 300 differs from the previous embodiment, at least in that, a signal generation/detection module 310 is employed both to provide a signal to a particular row and to detect a change in the signal being provided to that particular row. The signal generation/detection module 310 operates cooperatively with a MUX 312 to apply a signal and detect that signal being applied to each of the rows and columns of the conductive pattern of the touchscreen.

When a user does interact with the touchscreen, an increased capacitance will be introduced corresponding to the location of the user's interaction. This increased capacitance introduces a reduced impedance path at the location of the user's interaction and will incur a change in the signal being provided to a particular row or column. By providing a signal to each of the rows and columns of the conductive pattern of the touchscreen and by detecting for any change in those successively applied signals, the location of the user's interaction with the touchscreen may be determined.

Therefore, by detecting a change in a signal provided to a particular row and also by detecting a change in a signal provided to a particular column, an intersection of the identified row and column can provide a calculated estimate of the location of the user's interaction with the touchscreen.

For each of the cross point detection and the zone detection approaches of the previous embodiments, the application of signals need not be purely successive in nature. For example, a signal need not necessarily be applied to row 1, then to row 2, then to row 3, etc. Alternatively, a signal may be applied to row 1, then to row 8, then to row 2, etc. In even another embodiments, a signal may be applied initially to every Nth row (where N is an integer), and then the signal may be applied to every row between 1 and N−1, then to rows N+1 to 2N−1, etc. A wide variety of scanning techniques may be performed in accordance with either of the cross point detection and the zone detection approaches of the previous embodiments.

As referenced above, prior art conductive patterns as employed within a touchscreen are often composed of discrete diamond shaped touch areas that are connected together. A linear movement of a user's interaction with a touchscreen across the active area of the touchscreen with the prior art conductive patterns inherently introduces non-linearity in the signal response of signals used to detect such user's interaction. Ideally, the signal response would be as smooth and linear as possible, but prior art conductive patterns simply cannot provide for such a smooth and linear response. Because larger the pitch typically exists between conductors within a prior art conductive pattern, the number of different pads below the contact point is reduced and thus provides a "stair step" response in relation to the user's movement or location identification. This further exacerbates the deleterious effects inherent to the prior art discrete diamond shaped patterns employed within prior art touchscreens. This "stair stepping" of the output of a signal employed to detect such a user's interaction with the touchscreen thus is a function, with prior art designs, of the size of the diamond shaped touch areas. Increasing touch area size to correspond with the increases in pitch also produces an energy non-uniformity (e.g., extending normal to the surface of the touchscreen or in the z-axis direction if the x and y axes are deemed to be the touchscreen surface) between rows and columns that makes it more difficult to set touch/no-touch thresholds within a touchscreen system.

Embodiments of the novel touchscreen architecture presented herein, and equivalents thereof, provide a smoother and more linear response to a user's interaction with a touchscreen including the instance when the user's interaction moves across the surface of the touchscreen even in a diagonal direction. In one embodiment, such a novel touchscreen uses an elongated intermeshed pattern in which a conductor has extensions or protrusions into an adjacent conductor thereby increasing the affect of linear meshing between those conductors. Thus, FIG. 2 and FIG. 3 exemplify scanning methodologies that may be employed with the conductive patterns and embodiments of the invention.

Figure 4B:
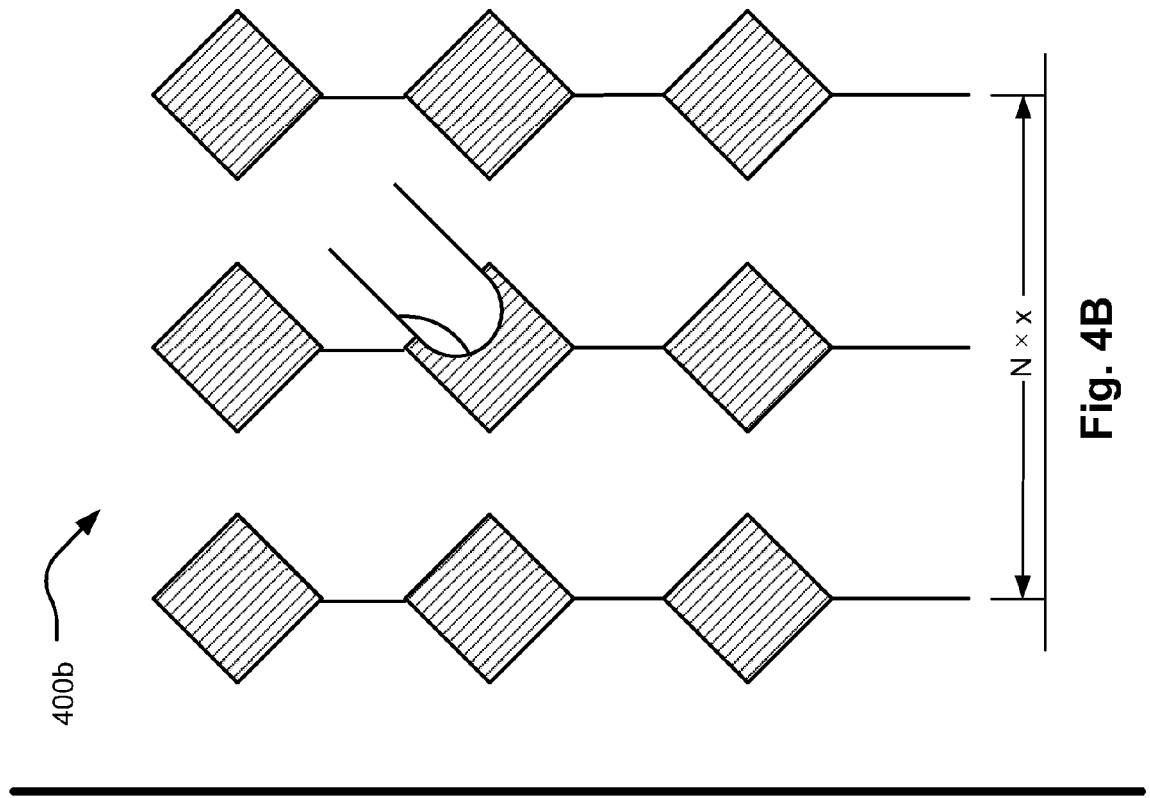
FIG. 4B illustrates an embodiment of a scaled conductive pattern as employed in a touchscreen (e.g., as used in a larger touchscreen than that of FIG. 4A).
Figure 4A:
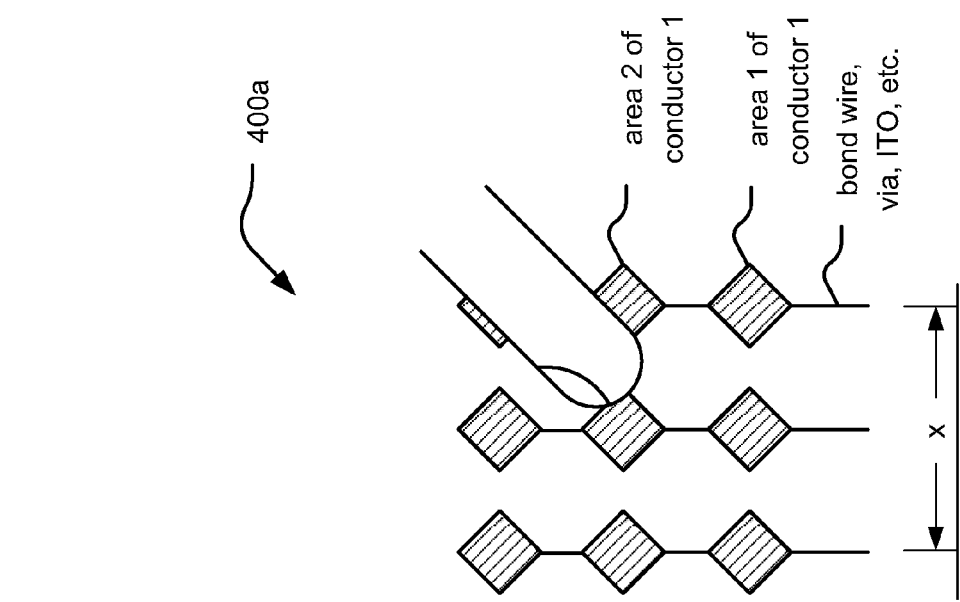
FIG. 4A illustrates an embodiment of a conductive pattern (e.g., indium tin oxide (ITO) as may be deposited on a substrate composed of polyester or other material) as employed in a touchscreen.

FIG. 4A illustrates an embodiment 400a of a conductive pattern (e.g., indium tin oxide (ITO) as may be deposited on a substrate composed of polyester or other material) as employed in a touchscreen. In embodiment 400a, it can be seen that a plurality of conductors (e.g., either rows or columns) of a conductive pattern of a touchscreen each include a number of areas (e.g., shown as diamonds in this particular embodiment, though any desired shape could alternatively be employed—such as circle, a triangle, an ellipse, a rectangle, a square, any other shape or any combination of shapes). These areas of a particular conductor may be coupled together using the same conductive material of which the areas are constructed (e.g., ITO). Alternatively, bond wires, via, or some other means may be employed to connect the areas of a conductor together.

In this embodiment 400a, three separate conductors are shown as spanning a width of x (which may be any desired number characterized in any desired unit of length/distance measurement). A user's finger is shown as interacting with these particular conductors of the conductive pattern of the touchscreen, and it can be seen that the user's finger spans a number of conductors (i.e., the user's finger touches multiple areas of multiple conductors).

FIG. 4B illustrates an embodiment 400b of a scaled conductive pattern as employed in a touchscreen (e.g., as used in a larger touchscreen than that of FIG. 4A). One approach to allow the use of existent touchscreen technology for larger touchscreens (e.g., those reaching up to 12" diagonal or even larger) is to scale the design of the embodiment of 400a in an effort to cover a much larger area. In other words, the very same design is employed as in embodiment 400a except using with conductors having larger areas and being spaced apart in accordance with similar scaling by which the size of the areas of the conductors are scaled. In this embodiment, the size of the touchscreen in embodiment 400b is scaled by a factor of N when compared to the size of the touchscreen in embodiment 400a.

Generally speaking, a human finger may be viewed as having a width in the range of 5 mm (e.g., for a child or very small person) to up to 12-15 mm (e.g., for an adult or larger person). As can be seen, when the areas of the conductor are scaled a sufficient amount, they become even bigger than a particular area of a particular conductor. When a user touches anywhere within such a large area of a conductor, then it is difficult or impossible to discern where within that particular area the finger actually is. As such, the ability to identify the particular location of a user's touch becomes far less precise, and touch's location may be mis-calculated and/or missed altogether.

FIG. 5A illustrates an embodiment 500a of a column or row of a conductive pattern, as employed in a touchscreen, that includes multiple areas. In this embodiment 500a, a single conductor includes areas and extended areas. For example, area 502 is coupled to two extended areas 501 and 503. A single input/output connection (I/O) provide a signal to area 502, and the signal may then be partitioned into as many as three components (i.e., one signal component that is provided directly to the area below area 502 as shown by connection/path 510, a second signal component that is provided from area 502 to area 503 and then downward from area 503 as shown by connection/path 510b, and a third signal component that is provided from area 502 to area 501 and then downward from area 501 as shown by connection/path 510a).

By providing areas and extended areas for a particular conductor, current of a signal provided into the I/O at the top of the diagram may be distributed into i1, i2, and i3. After passing through all possible paths of the conductor, the current output at a bottom I/O is shown as the sum of i1, i2, and i3. Certain of the connections between areas and extended areas are dotted lines, and these dotted lines may or may not include connections.

It is noted that the embodiment 500a corresponds to one single conductor (e.g., as may be implemented in a "row" or "column" of a conductive pattern of a touchscreen). Therefore, as can be seen, a designer has great flexibility in selecting which areas and extended areas may be employed within a particular conductor. By employing more paths through which a signal may pass, overall impedance of this particular conductor within the conductive pattern is decreased.

FIG. 5B illustrates an embodiment 500b of complementarily aligned columns and rows of a conductive pattern as employed in a touchscreen. This embodiment 500b shows a first conductor aligned in a first direction and a second conductor aligned in a second direction.

Again, it is noted that within a conductive pattern of a touchscreen, a first conductor aligned in a first direction and a second conductor aligned in a second direction may be co-planar (i.e., on a same plane within the touchscreen), or they may be on separate planes or layers within the touchscreen (e.g., such as separated by a dielectric material).

This embodiment depicts two parallel groups of areas connected to form one single "row". As can be seen, a single I/O is provided on the left hand side of the row, and there are two areas (or one area and one extended area) to which the signal may pass. Continuing to the right within the diagram, the areas of the conductor are connected together so that there are multiple paths through which the signal may pass. Again, certain of the areas (per design choice) may not be connected directly together (e.g., as shown by dotted lines).

Similarly, this embodiment depicts two parallel groups of areas connected to form one single "column". As can be seen, a single I/O is provided on the top of the column, and there are two areas (or one area and one extended area) to which the signal may pass. Continuing down through the diagram, the areas of the conductor are connected together so that there are multiple paths through which the signal may pass. Again, certain of the areas (per design choice) may not be connected directly together (e.g., as shown by dotted lines).

Figure 6:
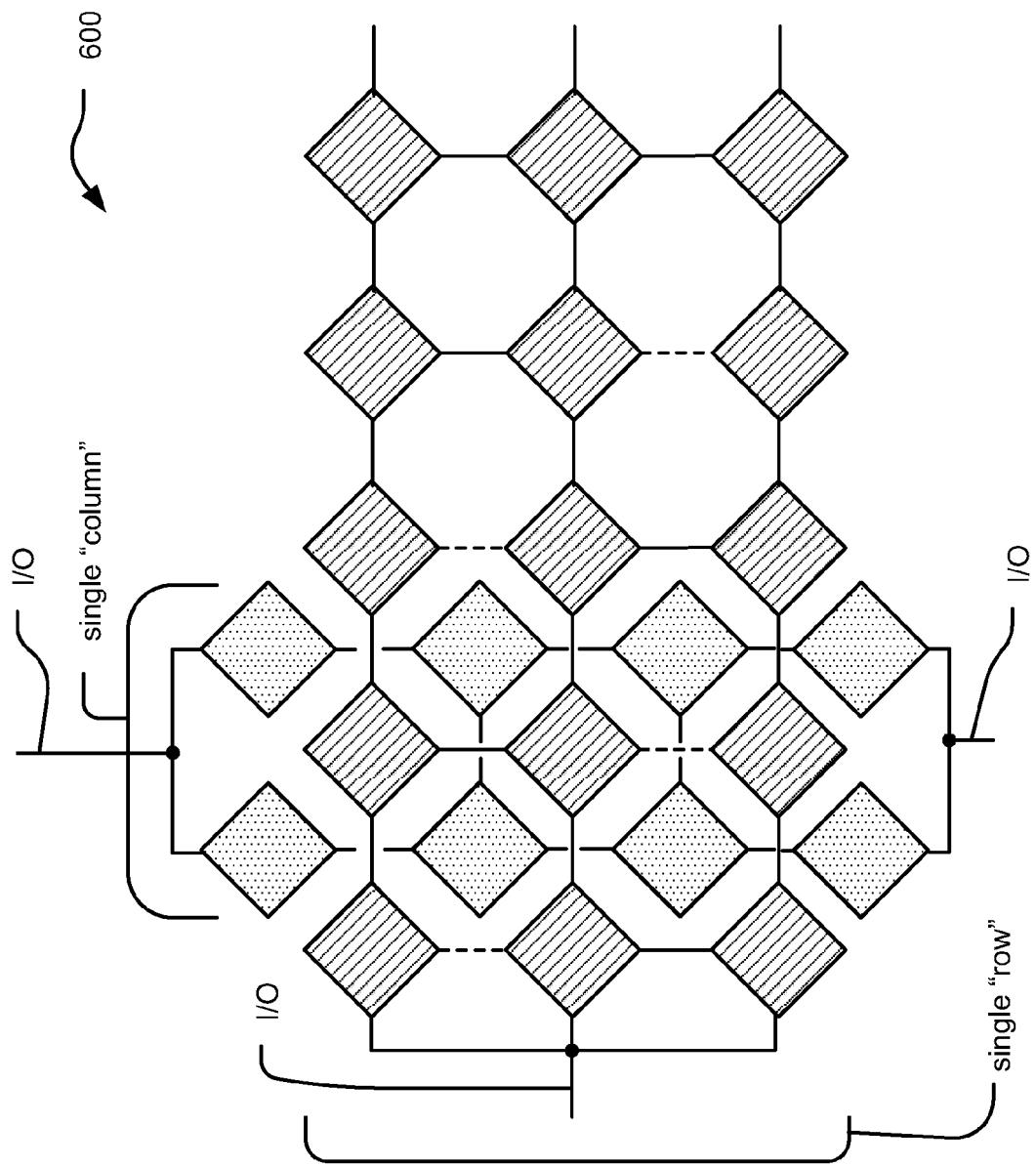
FIG. 6 illustrates another embodiment of complementarily aligned columns and rows of a conductive pattern as employed in a touchscreen.

FIG. 6 illustrates another embodiment 600 of complementarily aligned columns and rows of a conductive pattern as employed in a touchscreen. This embodiment is somewhat analogous to the previous embodiment, except that a different number of parallel groups of areas are employed to form a row than the number of parallel groups of areas that are employed to form a column. For example, two parallel groups of areas connected to form one single "column", and three parallel groups of areas connected to form one single "row". A designer can employ any desired number of groups of areas to form a single "column" or "row" without departing from the scope and spirit of the invention. Moreover, the selected groups of areas need not be adjacent, parallel groups of areas in certain embodiments.

Figure 7:
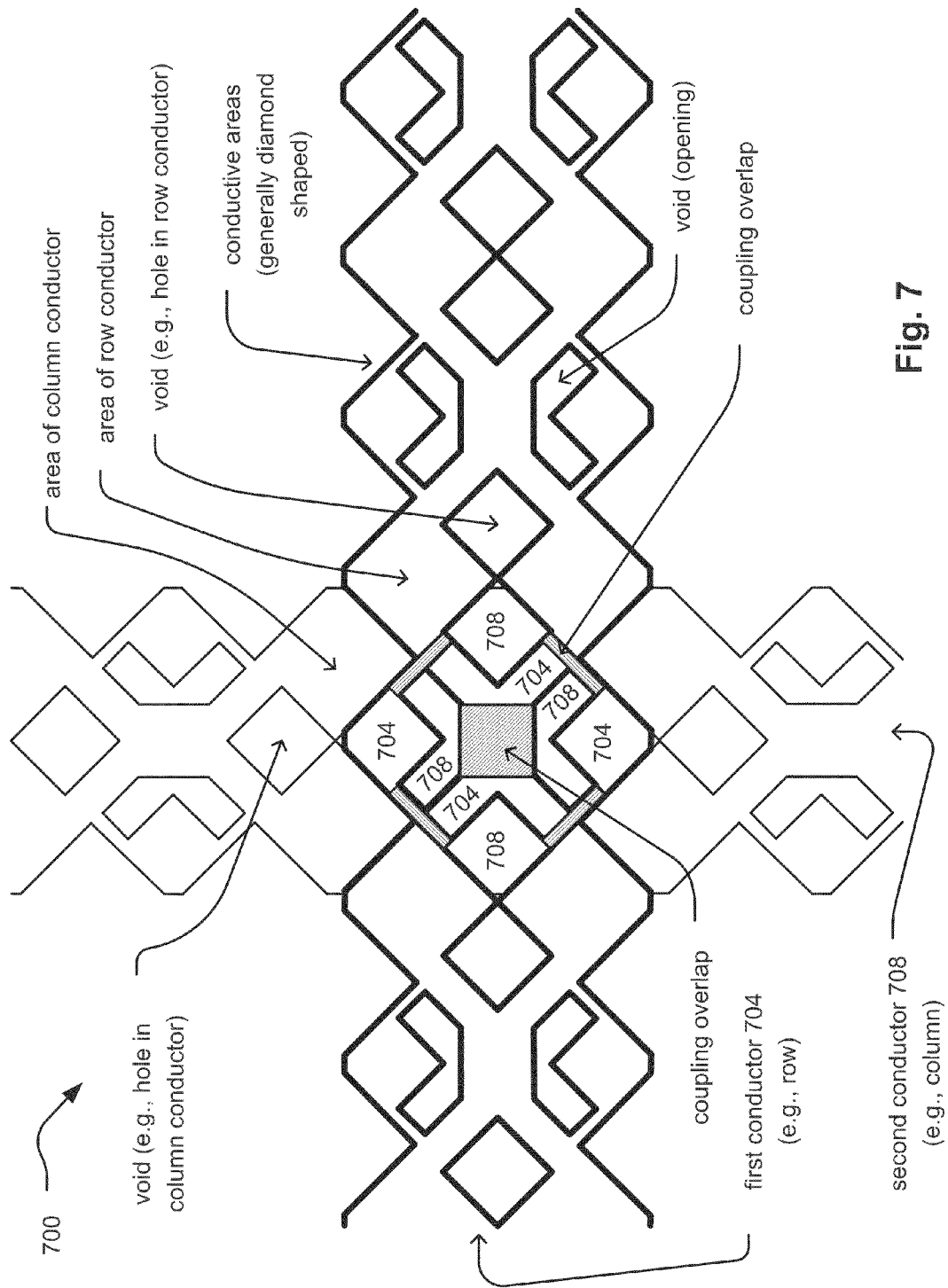
FIG. 7 illustrates another embodiment of complementarily aligned columns and rows of a conductive pattern, as employed in a touchscreen, that include extended areas.

FIG. 7 illustrates another embodiment 700 of complementarily aligned columns and rows of a conductive pattern, as employed in a touchscreen, that include extended areas. This conductive pattern may be employed within a touchscreen to assist in the detection of a touch point. One problem with having a relatively low number of shaped areas for sensing touch in relation to the size of the screen is either a touch may not be detected, its location may not be detected accurately, or, if the finger is moving and the contact area moves from region to region, a stair step pattern emerges even if the movement of the finger comprises a smooth curve or line. Accordingly, FIG. 7 illustrates a pattern for a conductor that defines a plurality of shaped areas that facilitate determine a touch location more accurately without increasing the number of sensing lines. As may be seen, FIG. 7 specifically shows a vertical sensing line and a horizontal sensing line, each of which includes a plurality of shaped areas.

The horizontally and vertically disposed sensing lines shown generally at 700 include a first conductor 704 that is arranged horizontally as a row and a second conductor 708 that is arranged vertically as a column. Each of the conductors 704 and 708 include shaped voids and a plurality of shaped areas that are conductive. More specifically, conductor 704 includes what is shown as voids in the row conductor, voids in the column conductor, shaped areas of row conductor, and shaped areas of column conductor. Additionally, as may be seen, areas of overlap for embodiments in which the first and second conductors 704 and 708 are disposed on separate planes are shown as coupling overlaps.

One aspect of the first and second conductors 704 and 708 is that the pattern of conductive shaped areas and voids of the first conductor 704 are substantially complementary with the conductive shaped areas and voids of the second conductor 708. Stated differently, a void of first conductor 704 is axially aligned with a conductive shaped area of second conductor 708 that is sized and shaped similarly to the void to reduce overlap and capacitive effects from overlap. Similarly, a conductive area of first conductor 704 is axially aligned with a void of second conductor 708 that is sized and shaped similarly but to avoid or reduce overlap. Utilizing the shaped patterns of conductive areas and voids facilitates different signal responses for a touch which therefore support more accurate interpolation to determine a touch location. It should be noted that these complementary patterns intentionally have some slight overlap to support electromagnetic or capacitive coupling especially when a touch occurs.

Using a shaped area pattern as shown in FIG. 7 provides improved meshing from row to row and column to column and supports the calculation of an interpolated position which is more accurate and therefore provides a smoother pattern that corresponds to the movement of the finger. The use of larger pitch to reduce the number of lines for sensing touch, however, reduces the number of different pads below the contact point and thus reduces the meshing. Thus, the stair step pattern that represents movement of the touch results even for an interpolated output as the meshing decreases. This also produces a Z energy (e.g., along the Z axis)) non-uniformity between rows and columns which makes it more difficult to set touch/no-touch thresholds. Thus, an embodiment such as that shown in FIG. 7 that improves meshing improves location interpolation.

The embodiment in FIG. 7 includes a modified diamond pattern with openings and extensions that increase meshing under the touch for a given number of rows or columns of sensing lines. The openings and extensions can be formed from any shape (diamonds, circles, etc). In the described embodiment, diamonds are used because they produce the best linear meshing on the horizontal and vertical axis. The design is such that the pattern can be used for the row and column arranged first and second conductors 704 and 708 and will interlock in a manner in which the extensions of the row oriented first conductor 704 fill the openings of the column oriented second conductor 708, and conversely, the extensions of the column oriented second conductors 708 fill the openings of the row oriented first conductor 704.

Meshing as shown in FIG. 7 increases interpolation accuracy as the effective diamond pad size is reduced (e.g., cut in half). In the area on the simple diamond pattern where the user touch would be mostly connecting first and second conductors 704 and 708, there is a 50% distribution to both row and column. This greatly increases the uniformity of the data for movement. Thus, stair stepping is greatly reduced as the number of shaped areas under the finger is increased and there are no longer "large steps" in the pattern itself even if a screen size is increased while a number of sensing lines is not commensurately increased.

The overlap area of the simple diamond pattern is kept small to reduce stray capacitance but must be large enough to keep the diamond to diamond resistance small for a conductor such as conductors 704 and 708. The present embodiment of FIG. 7 has five potential overlapped areas (center area and four sides of center area). A minimum of three overlapped areas is desirable (e.g., center area and two side areas) or a combination of four overlapped areas (no center area and four side areas) may be used. These combinations allow for more flexibility in the design. For example the center area could be made with smaller overlap than the current diamond technology (even though doing so results in increased resistance) wherein the sides allow for connection of the extension conductors and at the same time lower the diamond to diamond resistance. The stray capacitance of the combinations can be made to match the single connection technology.

The pattern of FIG. 7 is fractal in nature and the intermeshing may be designed to a much smaller scale than is shown in FIG. 7. This embodiment of the invention is expected to assist in the meshing from 4 mm pitch up to about 24 mm pitch. Larger sizes may desirably include or require a different pattern that allows more row to row interlocking and column to column interlocking. Such a pattern contains aspects of the present invention and is considered to be another embodiment. While the above description is made in terms of solving sensing problems for larger screens, the same principles could be applied and are relevant to smaller screen sizes that require higher resolution.

Much of the discussion regarding interlocking or meshing is in terms of interaction or structural arrangements between a first conductor oriented in a first direction and a second conductor oriented in a second direction. The first and second directions need not be horizontal and vertical. The example of horizontally directed and vertically directed conductors or sensing lines is for simplifying figures and associated explanations. More generally, the first and second conductors are merely directed in different directions.

Interlocking or meshing may also occur between rows of first conductors 704 and/or between columns of second conductors 708 in a similar fashion described above. Generally, a more interlocking conductive pattern provides a higher interpolated resolution between adjacent rows, adjacent columns, and between rows and columns. This pattern of FIG. 7, however, illustrates the interlocks first conductor 704 that is horizontally arranged in a row to the second conductor 708 that is vertically arranged in a column to smooth the Z axis energy. FIG. 7 also helps mesh the row to row and column to column conductors 704 and 708 by making the edges more uniform, but it does not provide interlocking between row oriented conductors or between column oriented conductors. Such interlocking between conductors oriented in a first direction with each other and conductors oriented in a second direction with each other is included in alternate embodiments of the invention.

The patterning of FIG. 7 allows the user's finger to more evenly couple to the rows and columns at any given pitch. The prior art diamond pattern only works when the diamonds are very small relative to the contact pad of the user. For about an 8 mm pitch, the diamond shaped areas are too large for the typical user and the output data begins to show non-uniform output with a stair step pattern based on the position of the contact area in relation to the location of the diamond shaped areas even if the user finger is moving in a smooth continuous line or even in a straight line that is not vertical or horizontal in orientation (or, more specifically, parallel to a sensing line).

The shaped areas of the first and second conductors 704 and 708 of the embodiment of the present invention can be adjusted by increasing or decreasing the openings and extensions. The openings in a row reduce the pad area for the row. In one embodiment, the openings, in relation to the shaped areas of the first or second conductors 704 and 708, are set at a 50-50 ratio. Stated differently, for an overall surface area of either first conductor 704 or second conductor 708, approximately 50% of the area comprises conductor material and approximately 50% of the area comprises open areas or voids that are defined by the shape and arrangement of the first or second conductors.

Of course, it is noted that different percentages could alternatively be employed as desired (e.g., approximately 70% of the area comprises conductor material and approximately 30% of the area comprises open areas or voids, approximately 30% of the area comprises conductor material and approximately 70% of the area comprises open areas or voids, or any other ratio of conductor material to open areas or voids as a designer may choose which may generally be referred to as X % conductor material to (100-X) % of open areas or voids, where X is a designer selected parameter greater than 0 and less than 100).

Figure 8B:
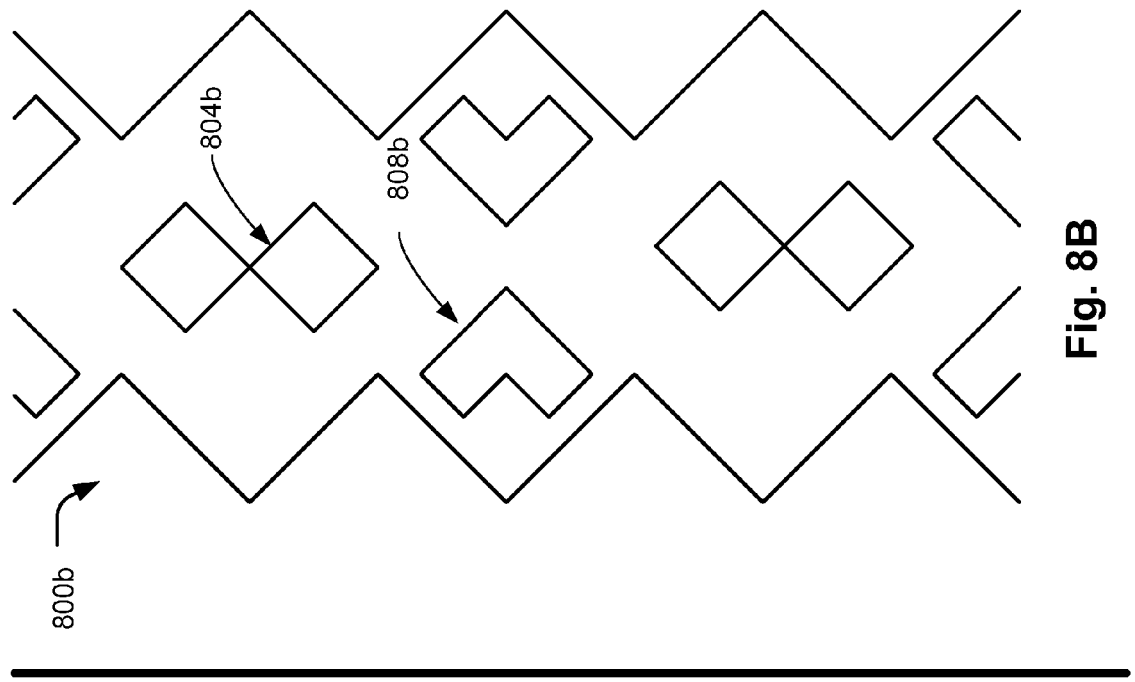
FIG. 8B illustrates another embodiment of a column (or row) of a conductive pattern, as employed in a touchscreen, that include hole portions complementarily aligned and filled by a row (or column).
Figure 8A:
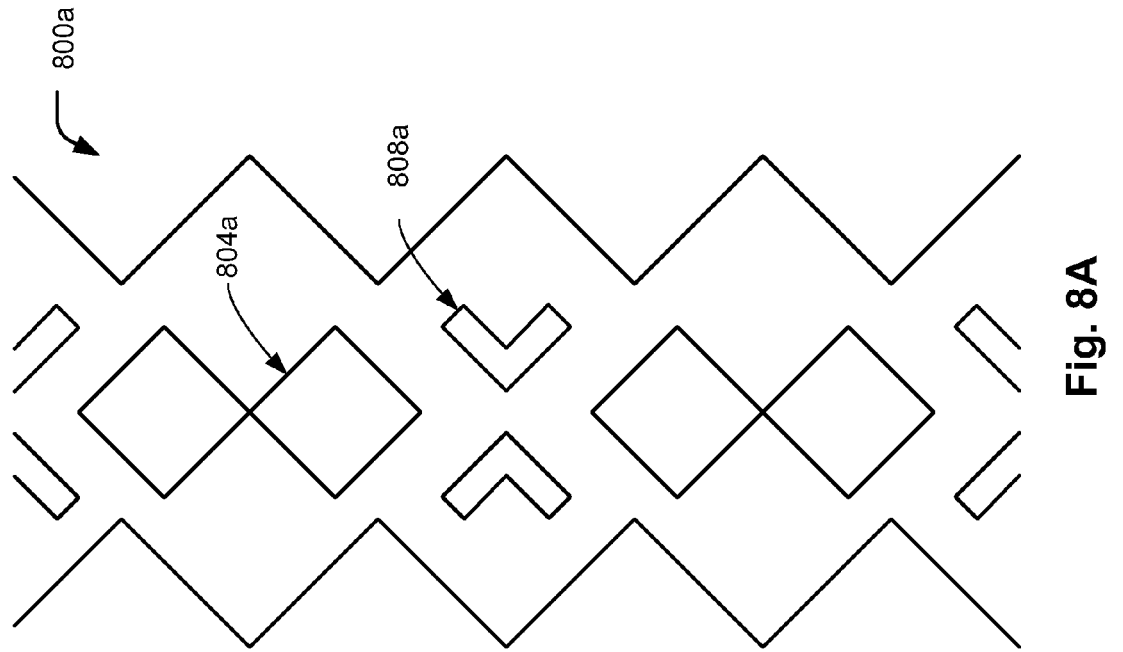
FIG. 8A illustrates an embodiment of a column (or row) of a conductive pattern, as employed in a touchscreen, that include hole portions complementarily aligned and filled by a row (or column).

FIG. 8A illustrates an embodiment 800a of a column (or row) of a conductive pattern, as employed in a touchscreen, that include hole portions complementarily aligned and filled by a row (or column).

FIG. 8B illustrates another embodiment 800b of a column (or row) of a conductive pattern, as employed in a touchscreen, that include hole portions complementarily aligned and filled by a row (or column).

FIG. 8A and FIG. 8B illustrate shaped relationships between conductive shaped areas and voids. In the embodiments of FIG. 8A and FIG. 8B, in relation to FIG. 7, the ratio of conductive shaped areas to voids changes according to the type of shaped area. For example, the conductive areas about the diamond shaped voids 804a of FIG. 8A (wherein the voids are defined by the surrounding shaped areas) are substantially larger than the diamond shaped voids 804b of FIG. 8B. Conversely, the "V" shaped voids 808b of FIG. 8B are substantially larger than the "V" shaped voids 808a of FIG. 8A. Overlapping areas of FIG. 8A and FIG. 8B may be wider, therefore, than what is shown in FIG. 7. For certain signal types and detection circuits, however, the effects of the increased capacitive effects (if any) may be more tolerable.

Figure 9:
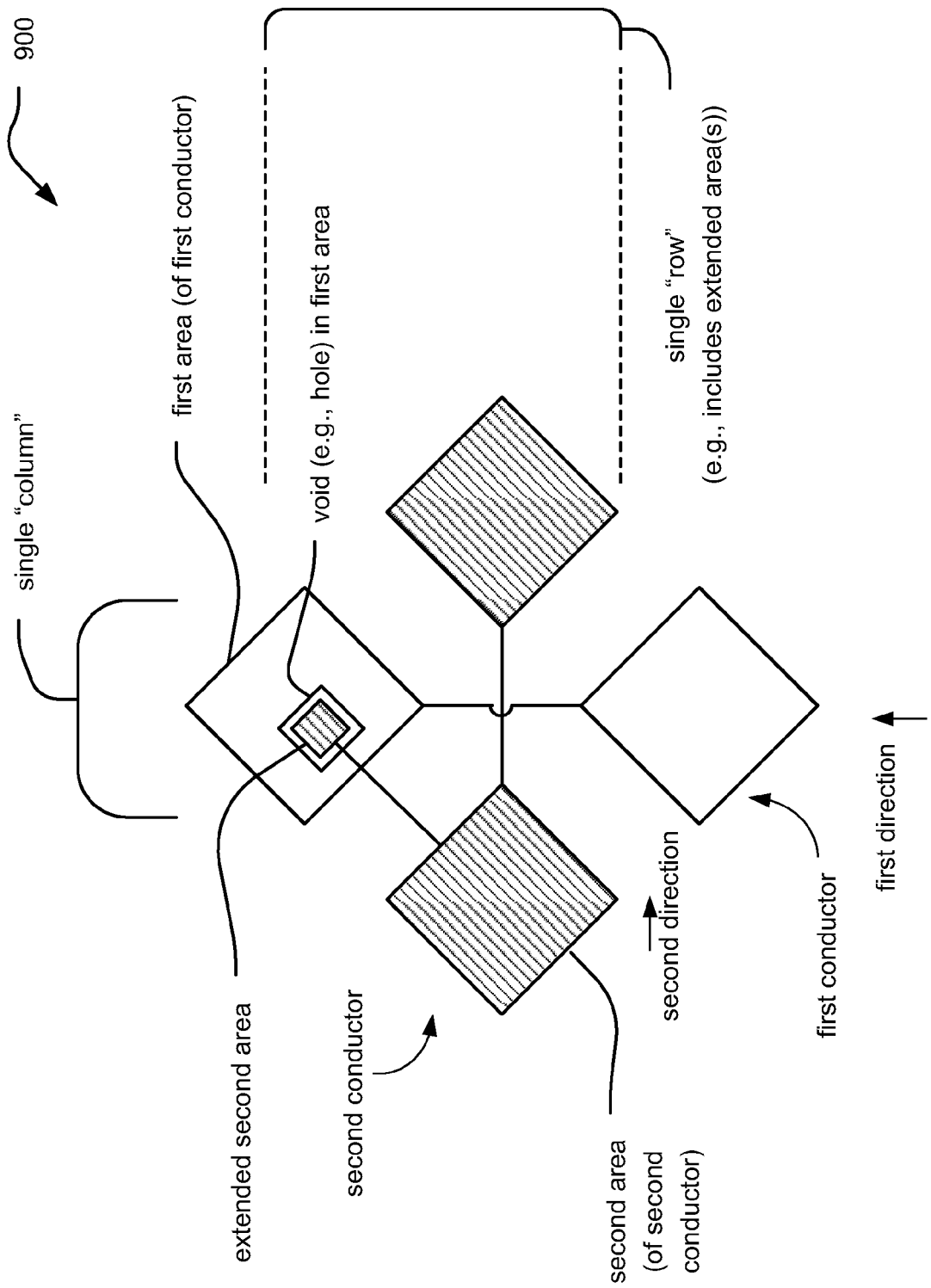
FIG. 9 illustrates an embodiment of a column and a row of a conductive pattern, as employed in a touchscreen, that include an extended area complementarily aligned with a hole of another area.

FIG. 9 illustrates an embodiment 900 of a column and a row of a conductive pattern, as employed in a touchscreen, that include an extended area complementarily aligned with a hole of another area. This diagram illustrates a first conductor in a first direction and a second conductor in a second direction with an extended area of the second conductor meshing with a shaped area of the first conductor according to one embodiment of the invention. While the first and second conductors are shown to be vertically and horizontally aligned, respectively, it should be understood that the first and second directions of the first and second conductor alignments are not required to be vertical and horizontal, respectively. Additionally, the first and second directions are not required to be orthogonal even though an orthogonal direction is shown. As may be seen, the first conductor comprises a single column that includes a first area (shaped area) and a second conductor that comprises a single row that includes a second area. An extended second area is coupled to the second area and is meshed or interlaced with the first area. As may be seen, the first area includes a void or hole defined by the shape of the conductive first area. The extended second area is complementary with and has little or no overlap with the void defined by the first area. In the example of FIG. 9, the first and second conductors may be coplanar or they may be disposed in different planes. In an embodiment in which the first and second conductors are disposed in different planes, a dielectric material is used (though other materials may be used) to separate the planes of the first and second conductors.

Figure 10:
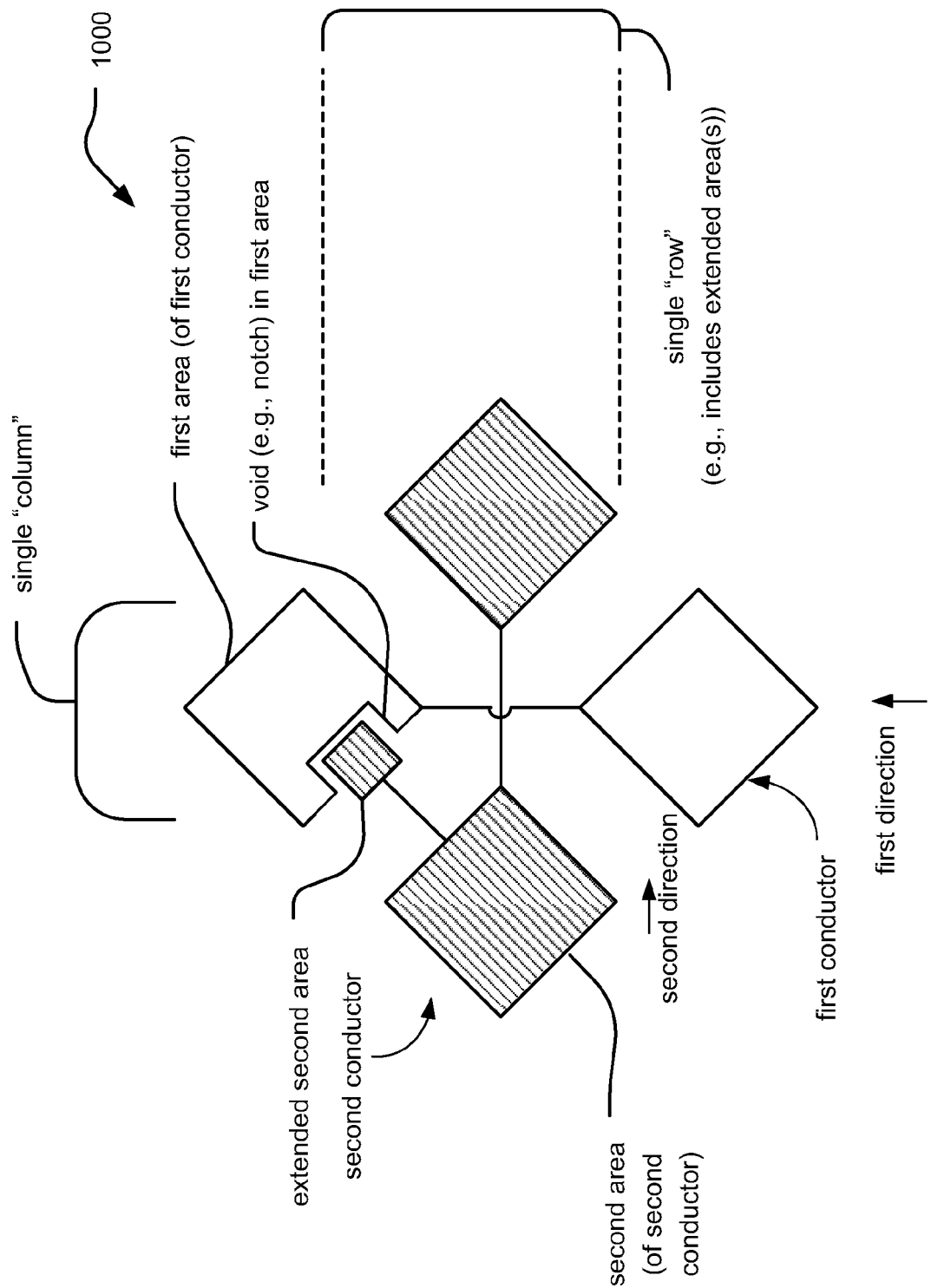
FIG. 10 illustrates an embodiment of a column and a row of a conductive pattern, as employed in a touchscreen, that include an extended area complementarily aligned with a notch of another area.

FIG. 10 illustrates an embodiment 1000 of a column and a row of a conductive pattern, as employed in a touchscreen, that include an extended area complementarily aligned with a notch of another area. This diagram illustrates a first conductor in a first direction and a second conductor in a second direction with an extended area of the second conductor meshing with a shaped area of the first conductor according to one embodiment of the invention. While the first and second conductors are shown to be vertically and horizontally aligned, respectively, it should be understood that the first and second directions of the first and second conductor alignments are not required to be vertical and horizontal, respectively. Additionally, the first and second directions are not required to be orthogonal even though an orthogonal direction is shown.

As may be seen, the first conductor comprises a single column that includes a first area (shaped area) and a second conductor that comprises a single row that includes a second area. An extended second area is coupled to the second area and is meshed or interlaced with the first area. As may be seen, the first area includes a void or notched area defined by the shape of the conductive first area. The extended second area is complementary with and has little or no overlap with the void or notch defined by the first area. In the example of FIG. 9, the first and second conductors may be coplanar or they may be disposed in different planes. In an embodiment in which the first and second conductors are disposed in different planes, a dielectric material is used (though other materials may be used) to separate the planes of the first and second conductors.

Figure 11:
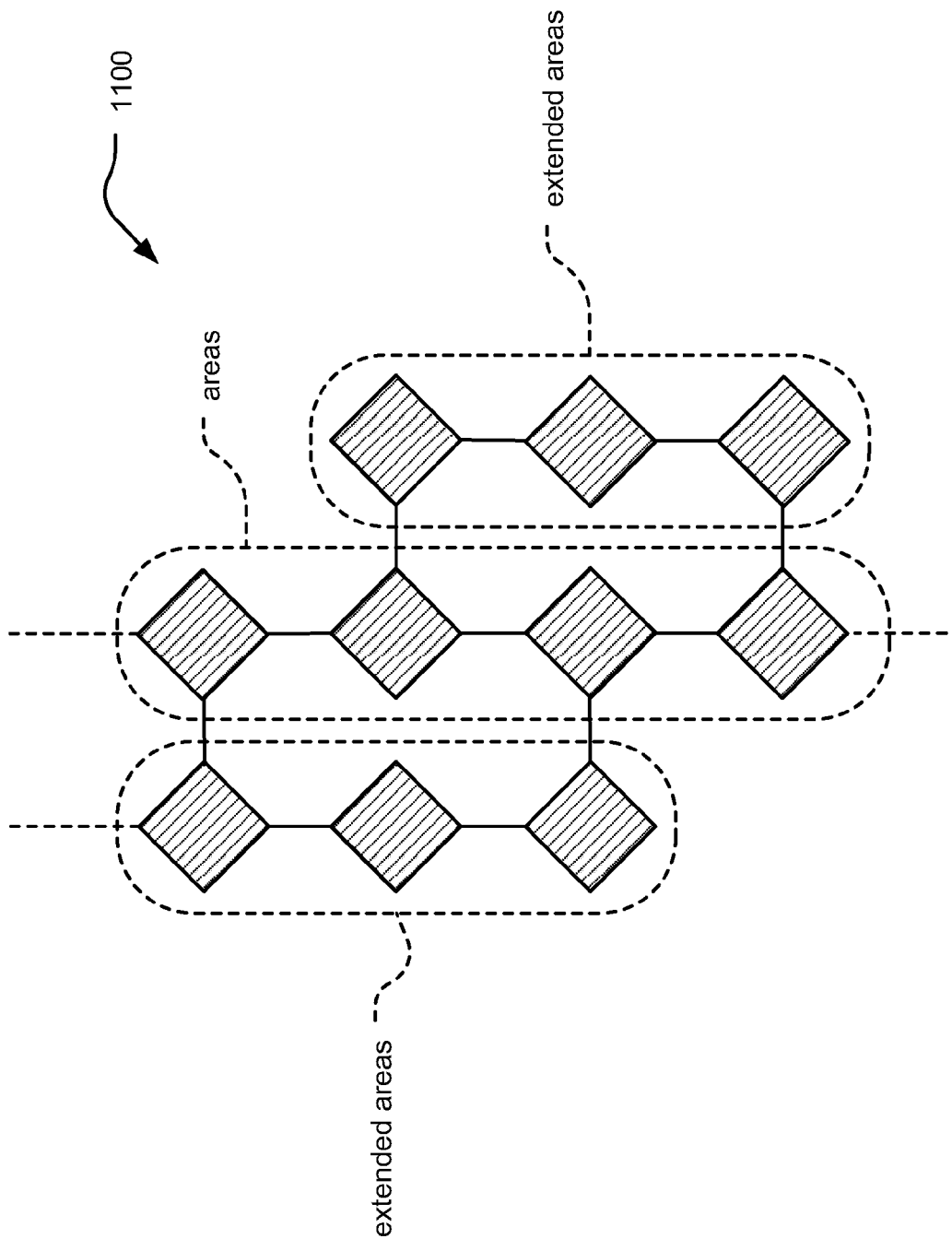
FIG. 11 illustrates an embodiment of a column and a row of a conductive pattern, as employed in a touchscreen, that include various extended areas.

FIG. 11 illustrates an embodiment 1100 of a column and a row of a conductive pattern, as employed in a touchscreen, that include various extended areas. This diagram illustrates a single conductor in a first direction having a plurality of extended areas that may be meshed with at least one of an adjacent and similarly aligned first conductor or with a second conductor (not shown) that is aligned in a second direction. Each of the plurality of extended areas in the embodiment of FIG. 11 includes a plurality of coupled shaped areas. In FIG. 11, the shaped areas are diamond shaped areas. One point to observe about the pattern of the single conductor is that the shaped areas may define an irregular pattern or topology. An irregular pattern that is similar to that of FIG. 11 will more likely be used in a configuration in which the first and second conductors are not coplanar. Other irregular patterns, however, may better facilitate a coplanar configuration of first and second conductors.

FIG. 12A and FIG. 12B illustrate embodiments 1200a and 1200b, respectively, of multiple columns and rows of a conductive pattern, as employed in a touchscreen, that include various extended areas. Particularly, FIG. 12A and FIG. 12B are exemplary diagrams of alternate meshed relationships of similarly aligned conductors. FIG. 12A illustrates parallel first conductors 1204a and 1208a shown generally at 1200a. FIG. 12B illustrates parallel first conductors 1204b and 1208b shown generally at 1200b. Small darkened ovals are shown to represent shaped areas that can have any defined shape including, as discussed before, diamond shaped areas. In FIG. 12A, first conductors 1204a and 1208a each have extended areas that are disposed in a symmetrically opposed arrangement in relation to a corresponding shaped area that is disposed in an axial center of the first conductors 1204a and 1208b. Further, the extended areas of first conductors 1204a and 1208a are meshed or interlaced.

Again, FIG. 12B illustrates parallel first conductors 1204b and 1208b shown generally at 1200b. Small darkened ovals are shown to represent shaped areas that can have any defined shape including, as discussed before, diamond shaped areas. In FIG. 12B, first conductors 1204b and 1208b have extended areas that are disposed in a non-symmetrically opposed arrangement in relation the axial center of the first conductors 1204b and 1208b. It should be noted that the number of shaped areas (not the extended shaped areas) that are disposed along the axial center of the first conductors are twice as numerous as the shaped areas of FIG. 12A as there is one shaped area for every extended shaped area. In FIG. 12A, there were two extended areas for each shaped area. Further, the extended areas of first conductors 1204*b* and 1208*b* are meshed or interlaced.

Figure 13B:
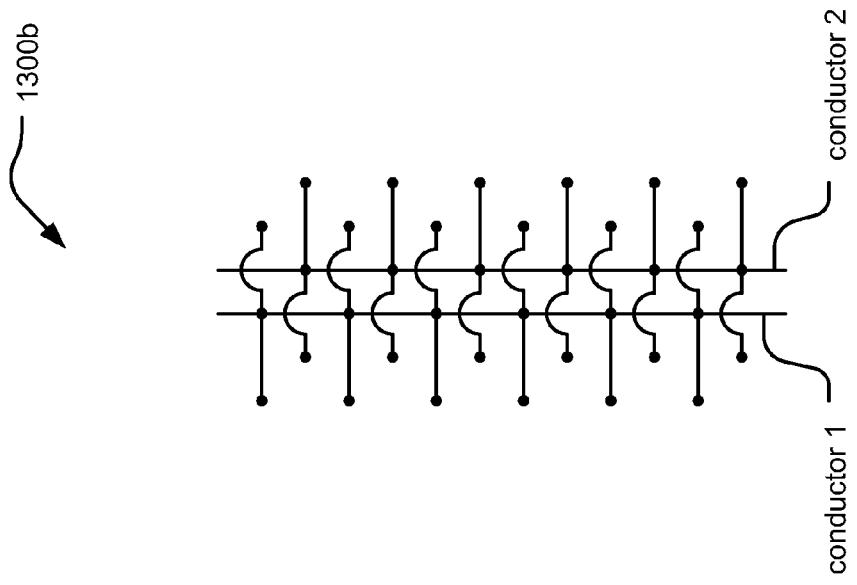
FIG. 13B illustrates another embodiment of multiple columns and rows of a conductive pattern, as employed in a touchscreen, that include various extended areas.
Figure 13A:
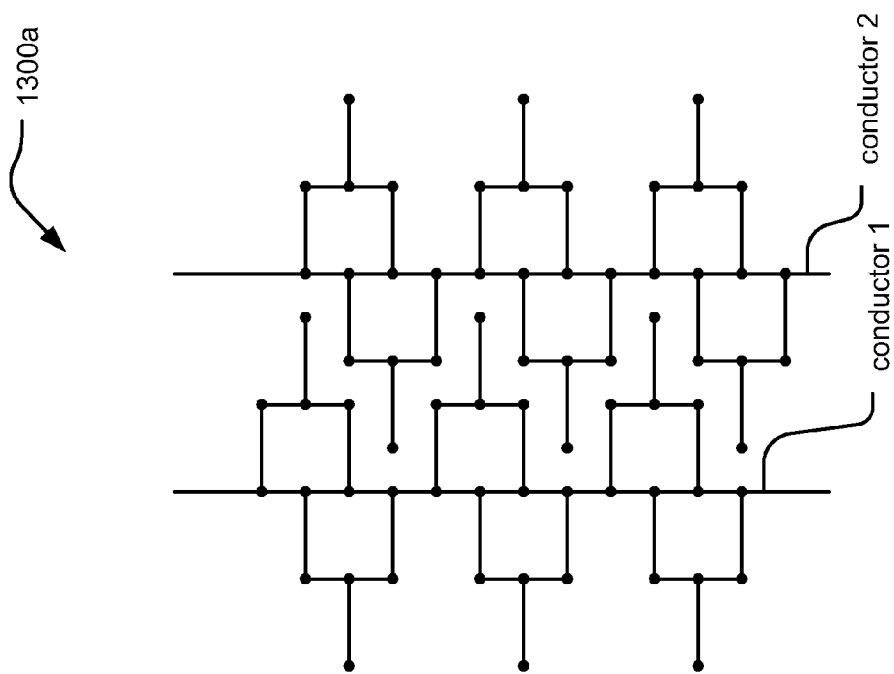
FIG. 13A illustrates another embodiment of multiple columns and rows of a conductive pattern, as employed in a touchscreen, that include various extended areas.

FIG. 13A and FIG. 13B illustrate embodiments 1300*a* and 1300*b*, respectively, of multiple columns and rows of a conductive pattern, as employed in a touchscreen, that include various extended areas. These diagrams show alternate patterns for shaped areas and extended shaped areas for first and second axially aligned conductors that are meshed or interlaced with each other. In general, FIG. 13A is presented to illustrate that patterns of shaped areas in relation to extended shaped areas can vary substantially and that no particular numerical ratio need exist between shaped areas and extended shaped areas. In FIG. 13A, 2 shaped areas correspond to 4 extended shaped areas. In contrast, FIG. 12A shows 1 shaped area corresponding to 2 corresponding extended shaped areas. In FIG. 12B, 1 shaped area corresponds to 1 corresponding extended shaped area. FIG. 13B is presented to illustrate that an extended shaped area may even be extended beyond an axial center of an adjacent conductor that is similarly directed (same axial direction).

FIG. 14 illustrates an embodiment 1400 of multiple columns and rows of a conductive pattern, as employed in a touchscreen, that include various extended areas of various shapes. This diagram illustrates a variety of extended shaped area patterns and complementary voids that are axially aligned with the extended shaped area for first and second conductors that are orthogonal relative to each other according to various embodiments of the invention. It may be seen that the extended shaped areas may be in the shape of a square, rectangle, circle, eclipse or other known shape. The corresponding voids may also have the shape of a square, rectangle, circle, eclipse or other known shape. In one embodiment, the extended area has a shape that is different from the corresponding void. More specifically, for the pattern shown generally b embodiment 1400, a first conductor 1404 includes a plurality of shaped areas and a second conductor 1408 includes a plurality of shaped areas that are interlaced with shaped areas of first conductor 1404. For one embodiment, the shaped areas of either conductor 1404 or 1408 (or both) may include (form) a void 1412 shaped differently from extended area 1416 which is extended from another conductor (e.g., from $2^{nd}$ conductor for a shaped area of $1^{st}$ conductor and vice versa). Here, void 1412 is square while extended area 1416 is circular. For those embodiments in which the extended shaped area and corresponding void have a similar shape, the sizing of each includes only a slight overlap or no overlap. Thus, for example, void 1420 and extended area 1424 are similarly shaped and are complementary with no overlap. Alternately, void 1420 and extended area 1424 may slightly overlap, especially if the first and second conductors are disposed on different planes to facilitate capacitive or signal coupling between the conductors when a touch occurs.

Figure 15A:
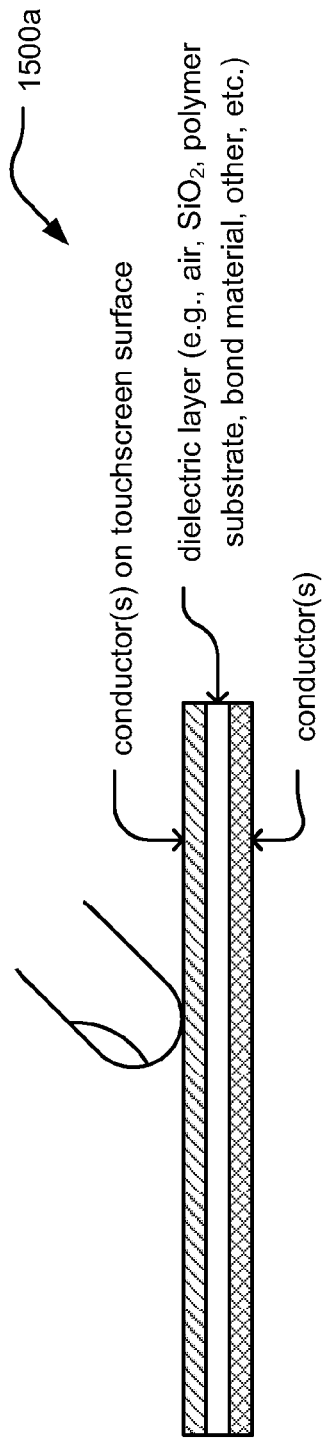
FIG. 15A illustrates an embodiment of placement of conductive patterns within a touchscreen.

FIG. 15A illustrates an embodiment 1500*a* of placement of conductive patterns within a touchscreen. As may be seen, the top layer of first conductors (e.g., as disposed as a top layer of the touchscreen) may be directly touched by a user when interacting with the touchscreen. As may further be seen, a dielectric layer separates the first and second layers of conductors (plurality of first and second conductors, respectively). The dielectric layer may be implemented any known dielectric including but not limited to air, semiconductor materials including $SiO_2$, polymer substrate materials, bond materials, etc.

Figure 15B:
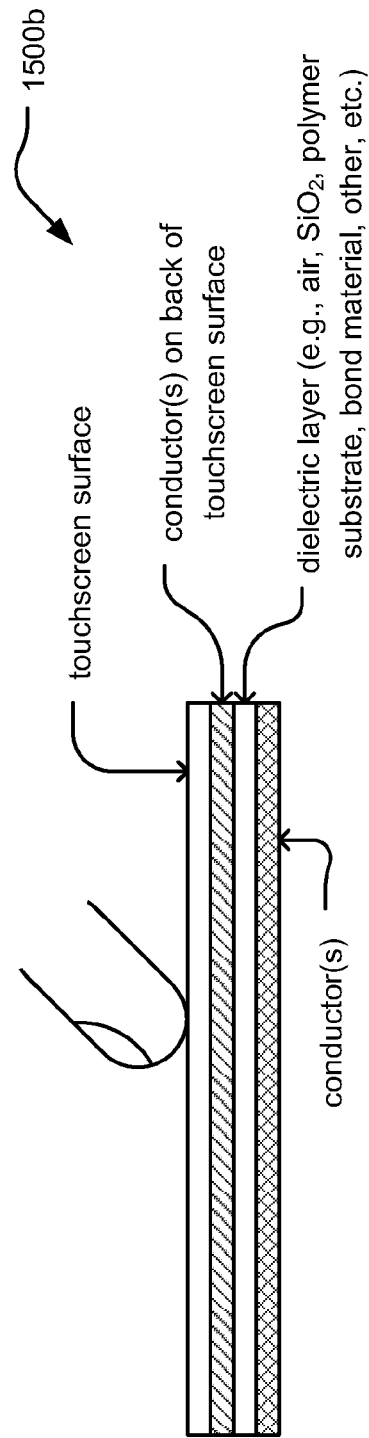
FIG. 15B illustrates an alternative embodiment of placement of conductive patterns within a touchscreen.

FIG. 15B illustrates an alternative embodiment 1500*b* of placement of conductive patterns within a touchscreen. Specifically, an additional touchscreen surface layer (e.g., a polymer layer, a protective layer, or otherwise) is disposed on top of the top layer of conductors such that a user does not directly touch the top layer of conductors. Any known material for forming a touchscreen surface that allows user interaction with the plurality of first and second conductors as described herein may be used.

FIG. 16A illustrates an alternative embodiment 1600*a* of placement of conductive patterns within a touchscreen. This embodiment 1600*a* shows conductors aligned in different directions that are implemented on a common layer or level within a touchscreen. The various areas of these conductors on this common layer can be connected together using vias, bond wires, etc. to ensure that conductors in a first direction (e.g., the columns) do not directly come into contact with conductors in a second direction (e.g., the rows). As may be seen, the first conductors and second conductors (e.g., as disposed as a common, top layer of the touchscreen) may be directly touched by a user when interacting with the touchscreen.

FIG. 16B illustrates an alternative embodiment 1600*b* of placement of conductive patterns within a touchscreen. This embodiment 1600*b* also shows conductors aligned in different directions that are implemented on a common layer or level within a touchscreen. Again, the various areas of these conductors on this common layer can be connected together using vias, bond wires, etc. to ensure that conductors in a first direction (e.g., the columns) do not directly come into contact with conductors in a second direction (e.g., the rows). An additional touchscreen surface layer (e.g., a polymer layer, a protective layer, or otherwise) is implemented on top of the layer or level of the touchscreen of which first conductors and second conductors are disposed. Any known material for forming a touchscreen surface that allows user interaction with the plurality of first and second conductors as described herein may be used.

Figure 17:
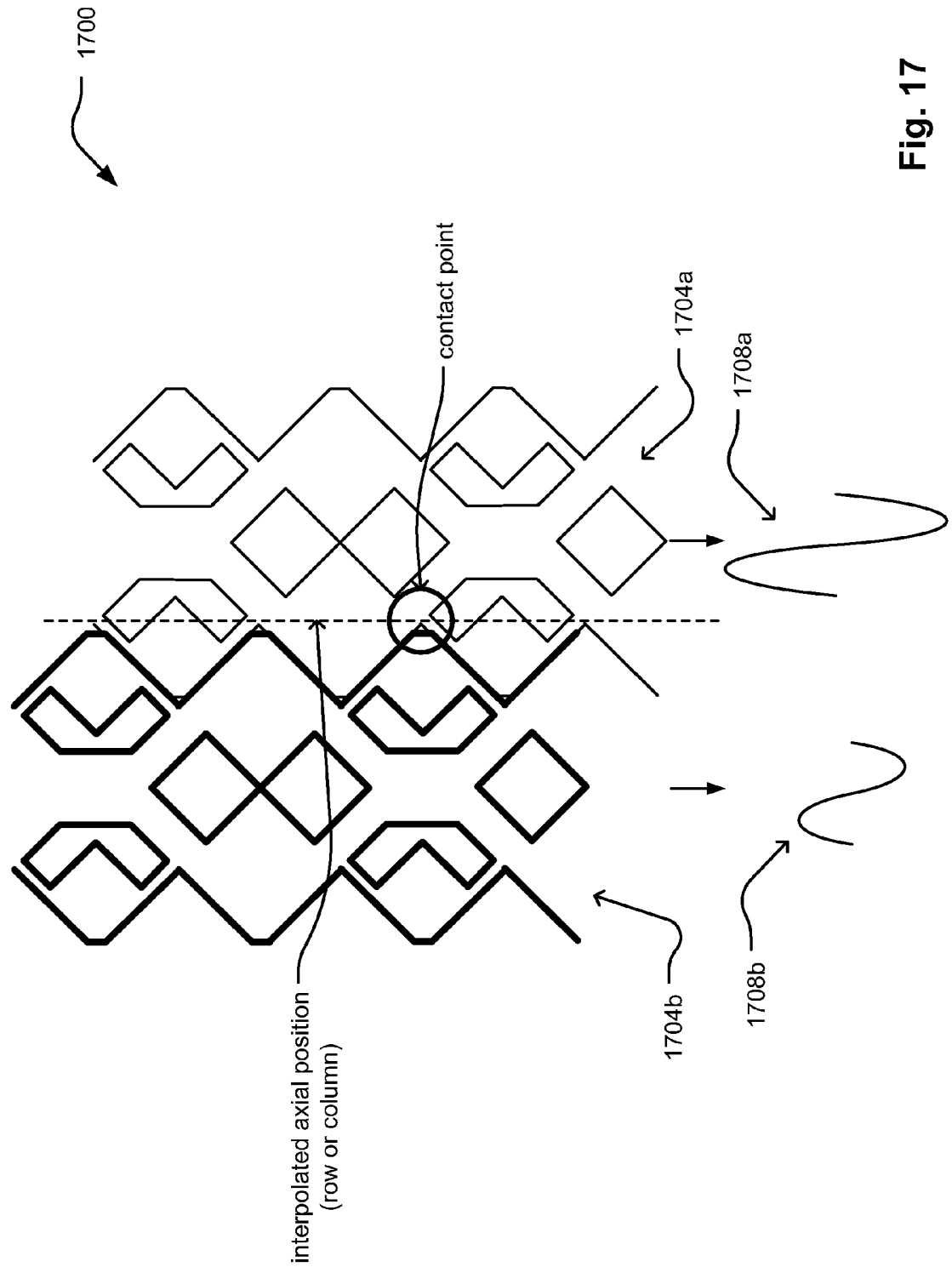
FIG. 17 illustrates an embodiment of a pair of conductors and associated signal responses from adjacent conductors of a conductive pattern.

FIG. 17 illustrates an embodiment 1700 of a pair of conductors and associated signal responses from adjacent conductors of a conductive pattern. For exemplary purposes, FIG. 17 employs conductors having areas and extended areas (e.g., using conductive patterns analogous to the embodiments of FIG. 7, FIG. 8A, FIG. 8B) in accordance with the principles discussed herein. It is of course noted that any conductor shape, pattern, etc. can be employed within the embodiment 1700.

In prior art systems, an axial position corresponds to the axis of a contacted conductor. Here, however, because of the use of areas and extended areas within various conductors, a user's interaction with the touchscreen (e.g., contact point) can provide differing amounts of contact with the various conductors. As may be seen in FIG. 17, the contact point illustrates that the contacted area of the spur of conductor 1704*a* is substantially greater than the contacted area of the spur of conductor 1704*b*. Accordingly, a signal response of conductor 1704*a* as shown at 1708*a* is substantially greater than a signal response of conductor 1704*b* as shown at 1708*b*. As will be discussed below, the signal responses 1708*a* can be compared to 1708*b* to determine an interpolated axial position as shown in FIG. 17.

Figure 18:
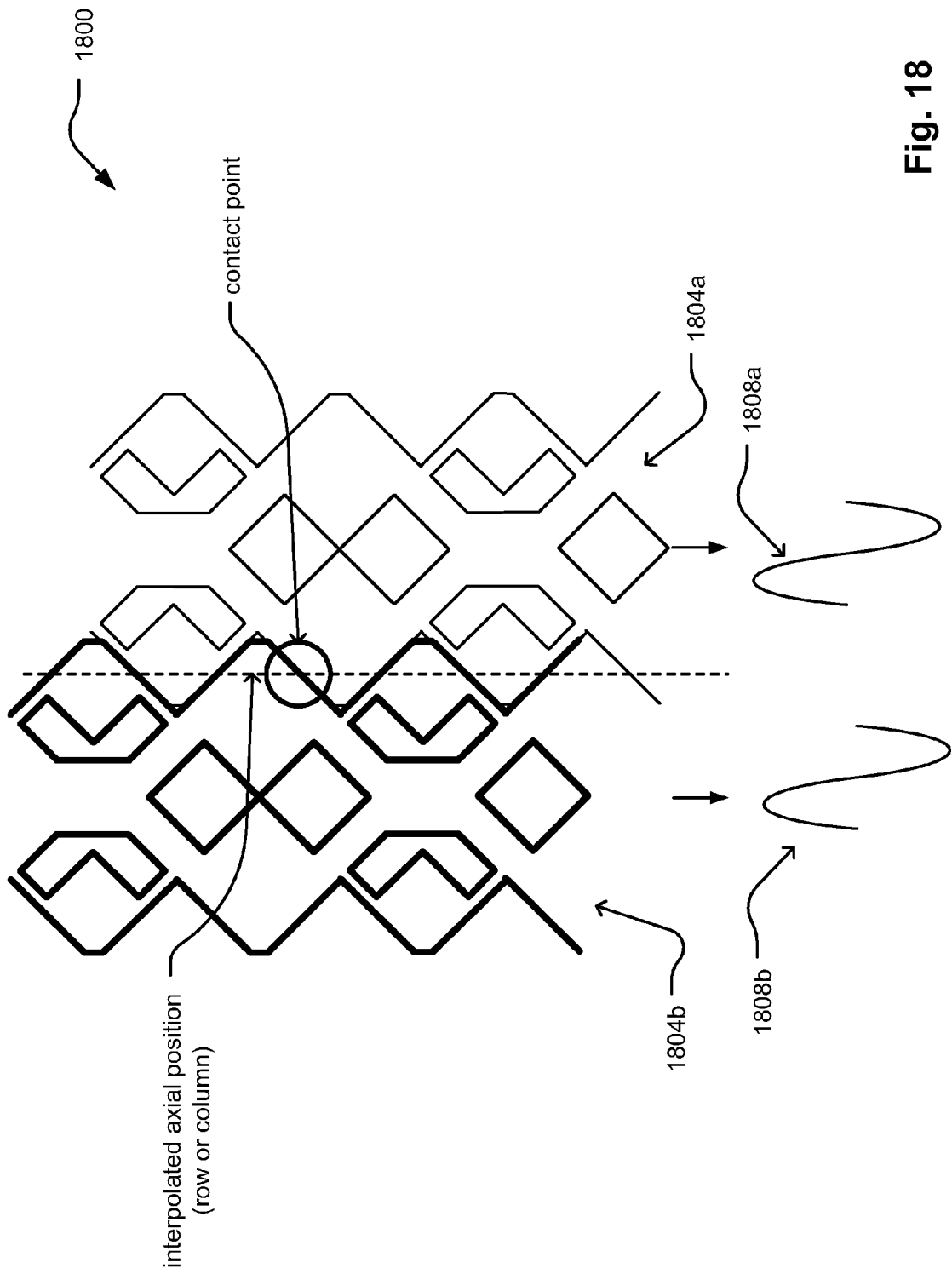
FIG. 18 illustrates an alternative embodiment of signal responses from adjacent conductors of a conductive pattern.

FIG. 18 illustrates an alternative embodiment 1800 of signal responses from adjacent conductors of a conductive pattern. Again, for illustrative purposes, FIG. 18 employs conductors having areas and extended areas (e.g., using conductive patterns analogous to the embodiments of FIG. 7, FIG. 8A, FIG. 8B) in accordance with the principles discussed herein. It is of course noted that any conductor shape, pattern, etc. can be employed within the embodiment 1800.

As may be seen, the contact point illustrates that the contacted area of the conductor 1804a is substantially equal to the contacted area of the conductor 1804b. Accordingly, a signal response of conductor 1804a as shown at 1808a is substantially equal to a signal response of conductor 1804b as shown at 1808b. As will be discussed below, the signal responses 1808a can be compared to 1808b to determine an interpolated axial position as shown in FIG. 18. As is suggested in FIG. 18, the interpolated axial position is the middle of the separation between the axial centers of conductors 1804a and 1804b.

Figure 19:
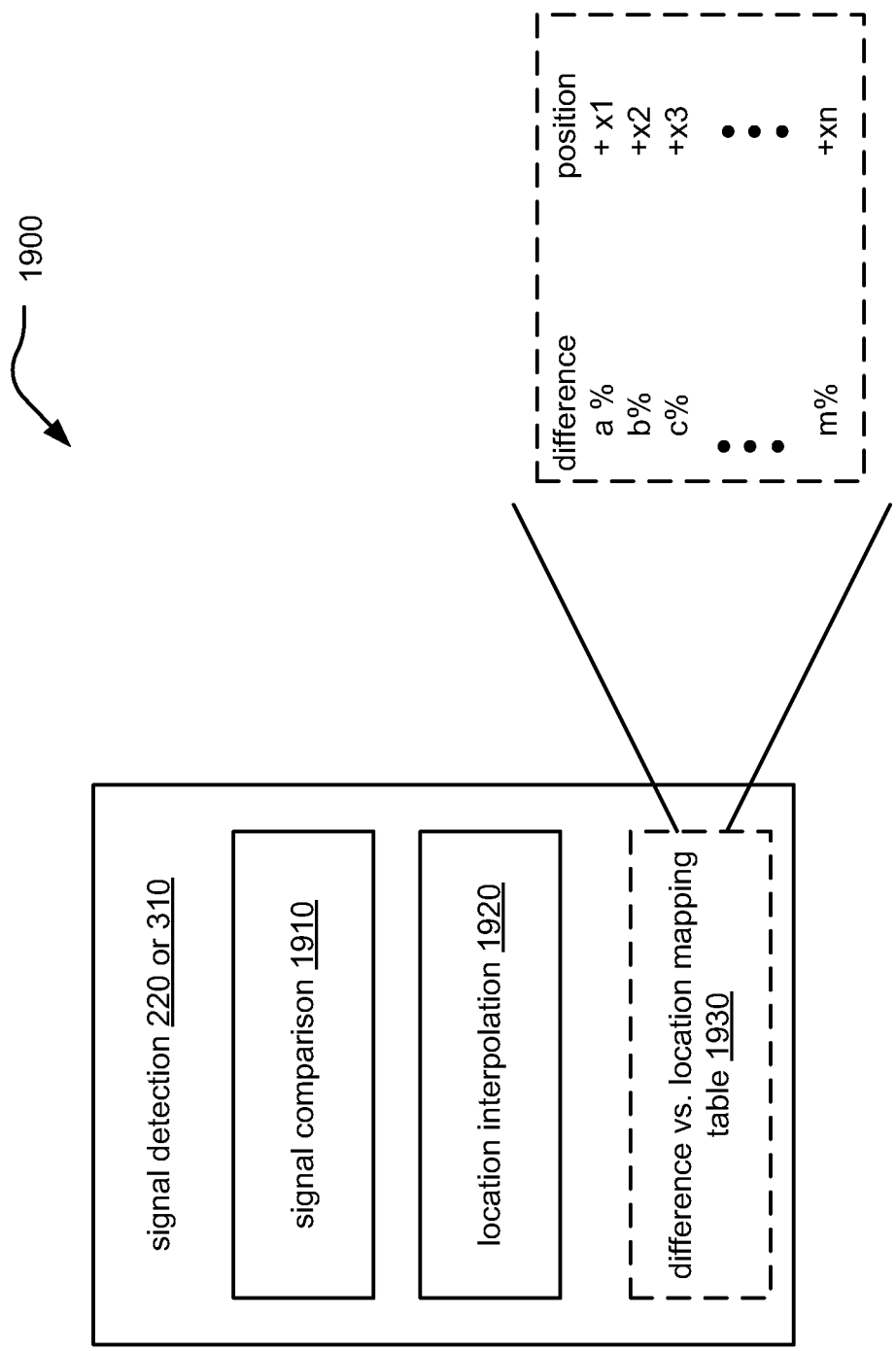
FIG. 19 illustrates an embodiment of a signal detection module.

FIG. 19 illustrates an embodiment 1900 of a signal detection module. In this embodiment 1900, the signal detection module can be implemented using any of the previous embodiments described herein (e.g., as depicted by reference numeral 220 in FIG. 2 or 310 in FIG. 3). Generally, the signal detection module of embodiment 1900 include a signal comparison module 1910, a location interpolation module 1920 and a mapping table 1930 that includes a mapping of response signal differences in relation to axial positions. The axial positions are the interpolated axial positions. Generally, signal comparison module 1910 compares the signal responses as illustrated in FIGS. 17 and 18 and determines a difference. For example, a difference may be described in terms of a percentage of the signal response of one conductor in relation to the other conductor. The differences may also be described in terms of absolute measurements (e.g., volts or amps).

Based on the determination of signal comparison module 1910, location interpolation module is operable to determine the interpolated axial position of a touch. This may be done through an algorithm that computes the position or by communicating with mapping table 1930 to obtain a mapped result for a detected difference in signal responses. In one embodiment, table 1930 specifies a range of differences for each interpolated position value. Thus, for example, if there are two hundred interpolated positions, each position may define a range of ½ of 1% of difference values. The different ranges may be specified in numerical values of a device or signal characteristic or in terms of relative differences (e.g., percentages as shown).

FIG. 20A and FIG. 20B illustrate embodiments 2000a and 2000b, respectively, of substantially complementary and substantially non-complementary overlap of conductors within a conductive pattern, respectively. Referring to embodiment 2000a of FIG. 20A, it may be seen that a first conductor overlaps a second conductor by an amount shown as the overlap area. The amount of area for which there is no overlap between the first and second conductors is substantially greater than the overlap area. Accordingly, it may be stated that the first and second conductors are substantially complementary. If there is no overlap area (e.g., the first and second conductors are perfectly aligned), then they are complementary. Generally, the overlap is kept to a minimal amount to minimize capacitive coupling between the first and second conductors.

Referring to embodiment 2000b of FIG. 20B, however, the amount of overlap area therein is much greater and the overlapped space of embodiment 2000a, and it may be stated that the first and second conductors are substantially non-complementary. Generally, the first and second conductors are complementarily aligned when the overlap area is approximately 10 percent or less of an area of a first or second conductor. A non-complementary overlap or alignment is one in which the overlap is greater than the complementary overlap (e.g., greater than 10 percent overlap). Clearly, other percentages and definitions may be employed to define constraints of non-complementary overlap and complementary overlap (e.g., greater than or less than 5%, 3%, etc.).

Figure 21A:
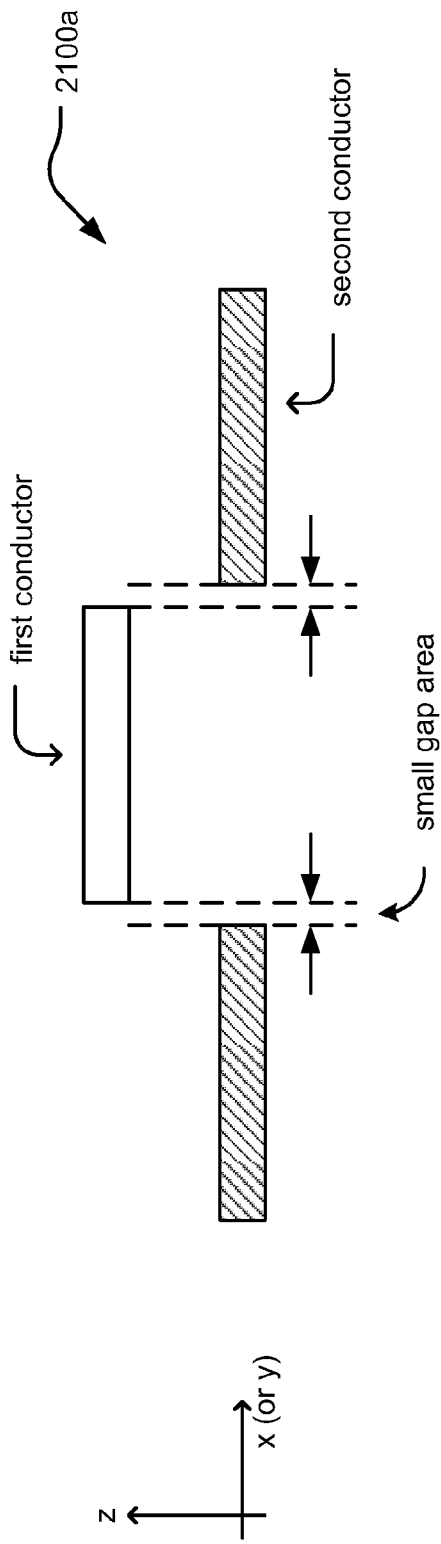
FIGS. 21A and FIG. 21B illustrate alternative embodiments of substantially complementary and substantially non-complementary overlap of conductors within a conductive pattern, respectively.
Figure 21B:
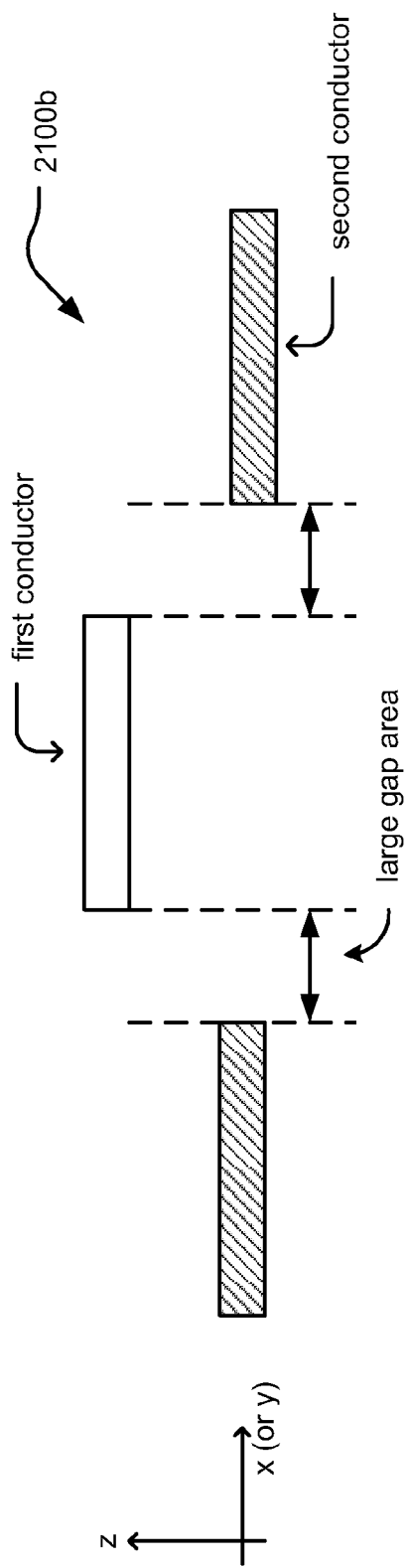

FIG. 21A and FIG. 21B illustrate alternative embodiments 2100a and 2100b, respectively, of substantially complementary and substantially non-complementary overlap of conductors within a conductive pattern, respectively. Referring to embodiment 2100a of FIG. 21A, it may be seen that a first conductor is separate from a second conductor by an amount shown as the small gap area. The amount of area for which there is a small gap area between the first and second conductors may be as small as the processing means employed to place the conductors on layers of the touchscreen. Accordingly, it may be stated that the first and second conductors are substantially complementary. If there is no gap area at all (e.g., the first and second conductors are perfectly aligned), then they are complementary.

Referring to embodiment 2100b of FIG. 21B, however, the size of the gap area is relatively larger than that of the previous embodiment, and it may be stated that the first and second conductors are substantially non-complementary. Again, generally, the first and second conductors are complementarily aligned when the overlap area is approximately 10 percent or less of an area of a first or second conductor. A non-complementary overlap or alignment is one in which the overlap is greater than the complementary overlap (e.g., greater than 10 percent overlap). Clearly, other percentages and definitions may be employed to define constraints of non-complementary overlap and complementary overlap (e.g., greater than or less than 5%, 3%, etc.).

FIG. 22A and FIG. 22B illustrate alternative embodiments 2200a and 2200b, respectively, of substantially complementary and substantially non-complementary overlap of conductors within a conductive pattern, respectively, that are implemented on a same level (or layer) within a touchscreen. Each of the embodiment 2200a and the embodiment 2200b shows conductors aligned in different directions that are implemented on a common layer or level within a touchscreen. The various areas of these conductors on this common layer can be connected together using vias, bond wires, etc. to ensure that conductors in a first direction (e.g., the columns) do not directly come into contact with conductors in a second direction (e.g., the rows).

Referring to embodiment 2200a of FIG. 22A, it may be seen that a first conductor is separate from a second conductor by an amount shown as the small gap area. The amount of area for which there is a small gap area between the first and second conductors may be as small as the processing means employed to place the conductors on layers of the touchscreen. Accordingly, it may be stated that the first and second conductors are substantially complementary. If there is no gap area at all (e.g., the first and second conductors are perfectly aligned), then they are complementary.

Referring to embodiment 2200b of FIG. 22B, however, the size of the gap area is relatively larger than that of the previous embodiment, and it may be stated that the first and second conductors are substantially non-complementary. Again, generally, the first and second conductors are complementarily aligned when the overlap area is approximately 10 percent or less of an area of a first or second conductor. A non-complementary overlap or alignment is one in which the overlap is greater than the complementary overlap (e.g., greater than 10 percent overlap). Clearly, other percentages and definitions may be employed to define constraints of non-complementary overlap and complementary overlap (e.g., greater than or less than 5%, 3%, etc.).

FIG. 23 illustrates an embodiment 2300 of a method for determining an interpolated axial position. The method operates by receiving a first signal or signal response from a first conductor, as depicted in block 2310 and receiving a second signal or signal response from a second conductor as depicted in block 2320. Thereafter, the method includes processing the first and second signal or signal responses to identify a user's relative interaction with the first and second conductors to determine an interpolated axial position in block 2330. Such processing can be as illustrated, for example, in either approach suggested in FIG. 23 such that the interpolated position is calculated or is determined by evaluating a detected difference in relation to a mapping table.

While certain of the described embodiments presented herein illustrate a relatively small number of aligned conductors. It should be understood that a touchscreen may have a different number of conductors (e.g., a substantially greater numbers of first and second conductors) aligned in first and second directions. The figures only show a few conductors in each figure to simply the explanation for the reader and to all the conductors to be drawn in a larger scale to support the associated descriptions.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, thermal noise, and/or other parameters. Moreover, references substantially covering an active surface area of a touchscreen can be as much as that which is allowed by the processing and manufacturing means employed to make the touchscreen (i.e., placing adjacent conductors as close to one another as possible using such means). In one embodiment, the closest that conductors are placed together is 40 microns using one presently available technology.

Alternatively, it is noted that a particular designer selected value (e.g., 90%, 95%, or other value) may correspond to substantially covering an active surface area of a touchscreen. Analogously, references to substantially complementary overlap and/or substantially non-complementary overlap may be likewise understood by the reader to be within such or tighter tolerances. For example, the substantially complementary overlap may be that which is limited by the processing and manufacturing means employed to make the touchscreen. Alternatively, a particular designer selected value (e.g., 1%, 5%, or other value) may correspond to substantially complementary overlap. As such, substantially non-complementary overlap may be any overlap that is different than substantially complementary overlap (e.g., greater than a value associated with substantially complementary overlap). Moreover, such references herein to approximately may also be construed in accordance with such principles.

It is noted that the various modules, blocks, elements or circuit devices described herein (e.g., signal generation module, signal detection module, signal generation/detection module, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims

What is claimed is:

1. A capacitive touch sensor pattern of a touch device, comprising:
    a first conductor including a plurality of first areas that are separate from one another and electrically coupled to one another along a first direction, the plurality of first areas forming at least a portion of a first sensing line that includes the plurality of first areas and a plurality of first openings; and
    a second conductor including a plurality of second areas that are separate from one another and electrically coupled to one another along a second direction other than the first direction, the plurality of second areas forming at least a portion of a second sensing line that includes the plurality of second areas and a plurality of second openings;
    wherein each of the plurality of first areas and each of the plurality of second areas are solid areas of conductive material;

wherein select ones of the first areas are axially aligned within corresponding select ones of the second openings;
wherein select ones of the second areas are axially aligned within corresponding select ones of the first openings;
wherein the first sensing line further includes an additional opening; and
wherein the second sensing line includes an extended area coupled to the plurality of second areas and complementarily aligned within the additional opening.

2. The capacitive touch sensor pattern of claim 1, wherein the first conductor and the second conductor are separated by a dielectric material.

3. The capacitive touch sensor pattern of claim 1, wherein:
the first conductor is implemented on a back of a surface of the touch device; or
the first conductor is implemented on the surface of the touch device.

4. The capacitive touch sensor pattern of claim 1, wherein: a shape of each of the first areas and the second areas is one of a circle, a diamond, a triangle, an ellipse, a rectangle, or a square.

5. The capacitive touch sensor pattern of claim 1, wherein:
the second sensing line further includes a plurality of second additional openings and a plurality of second extended areas coupled to the plurality of second areas;
the first sensing line further includes a plurality of first additional openings and a plurality of first extended areas coupled to the plurality of first areas;
select ones of the first additional areas are axially aligned with corresponding select ones of the second additional openings; and
select ones of the second additional areas are axially aligned with corresponding select ones of the first additional openings.

6. The capacitive touch sensor pattern of claim 5, wherein at least a portion of the first areas overlap corresponding ones of the second areas and at least a portion of the first extended areas overlap corresponding ones of the second extended areas.

7. The capacitive touch sensor pattern of claim 5, wherein:
each of the first additional openings is a first hole within one of the first extended areas;
each of the second additional openings is a second hole within one of the second extended areas;
each of the select ones of the first extended areas has a size and shape substantially the same as the second hole; and
each of the select ones of the second extended areas has a size and shape substantially the same as the first hole.

8. The capacitive touch sensor pattern of claim 5, wherein:
each of the first additional openings is a first notch within one of the first extended areas;
each of the second additional openings is a second notch within one of the second extended areas;
each of the select ones of the first extended areas at least partially resides within the corresponding second notch; and
each of the select ones of the second extended areas at least partially resides within the corresponding first notch.

9. The capacitive touch sensor pattern of claim 1, wherein:
the first conductor is one of a plurality of primary conductors aligned in the first direction and the second conductor is one of a plurality of secondary conductors aligned in the second direction;
each of the plurality of primary conductors includes a respective plurality of primary areas;
each of the plurality of secondary conductors includes a respective plurality of secondary areas;
each of the plurality of secondary conductors includes respective extended areas; and
the respective extended areas between adjacent secondary conductors of the plurality of secondary conductors are interleaved.

10. The capacitive touch sensor pattern of claim 9, wherein:
each of the plurality of primary conductors includes respective extended first areas; and
the respective extended first areas between adjacent primary conductors of the plurality of primary conductors are interleaved.

11. The capacitive touch sensor pattern of claim 1, wherein the first conductor and the second conductor are implemented on a common plane.

12. The capacitive touch sensor pattern of claim 11, wherein:
the plurality of first areas are connected via traces; and
the plurality of second areas are connected via bond wires.

13. The capacitive touch sensor pattern of claim 11, wherein:
the first conductor and the second conductor are implemented on a back of a surface of the touch device; or
the first conductor and the second conductor are implemented on the surface of the touch device.

14. A touch device, comprising:
a capacitive touch sensor pattern including:
a first conductor including a plurality of first areas that are separate from one another and electrically coupled to one another along a first direction, the plurality of first areas forming at least a portion of a first sensing line that includes the plurality of first areas and a plurality of first openings;
a second conductor including a plurality of second areas that are separate from one another and electrically coupled to one another along a second direction other than the first direction, the plurality of second areas forming at least a portion of a second sensing line that includes the plurality of second areas and a plurality of second openings;
wherein each of the plurality of first areas and each of the plurality of second areas are solid areas of conductive material;
wherein select ones of the first areas being axially aligned within corresponding select ones of the second openings;
wherein select ones of the second areas being axially aligned within corresponding select ones of the first openings;
wherein the first sensing line further includes an additional opening; and
wherein the second sensing line further includes an extended area coupled to the plurality of second areas and complementarily aligned within the additional opening; and
a circuitry that provides an energizing signal to the first conductor and detects a change in the energizing signal caused by a user's interaction with the touch device.

15. The touch device of claim 14, wherein the circuitry comprises:
an energizing circuitry that provides a signal to the first conductor; and
a detection circuitry that:
detects a signal received from the second conductor; and based on the received signal, identifies a location of a user's interaction with the touch device corresponding to an intersection of the first conductor and the second conductor.

16. The touch device of claim 14, wherein:
the user's interaction with the touch device is a finger of the user touching the touch device or a user stylus touching the touch device.

17. The touch device of claim 14, wherein the capacitive touch sensor pattern further includes a third conductor aligned in the first direction; and further comprising:
a circuitry that provides an energizing signal to the first conductor and detects a signal response in the third conductor caused by the user's interaction with the touch device.

18. The touch device of claim 14, further comprising:
an input/output (I/O) connector coupled to the second conductor.

19. The touch device of claim 18, wherein the I/O connector is coupled to one of the plurality of second areas.

20. The touch device of claim 14, wherein the first conductor and the second conductor are separated by a dielectric material.

21. The touch device of claim 14, wherein:
the first conductor is implemented on a back of a surface of the touch device; or
the first conductor is implemented on the surface of the touch device.

22. The touch device of claim 14, wherein:
a shape of each of the first areas and the second areas is one of a circle, a diamond, a triangle, an ellipse, a rectangle, or a square.

23. The touch device of claim 14, wherein:
the second sensing line further includes a plurality of second additional openings and a plurality of second extended areas coupled to the plurality of second areas;
the first sensing line further includes a plurality of first additional openings and a plurality of first extended areas coupled to the plurality of first areas;
select ones of the first extended areas are axially aligned with corresponding select ones of the second additional openings; and
select ones of the second extended areas are axially aligned with corresponding select ones of the first additional openings.

24. The touch device of claim 23, wherein at least a portion of the first areas overlap corresponding ones of the second areas and at least a portion of the first extended areas overlap corresponding ones of the second extended areas.

25. The touch device of claim 23, wherein:
each of the first additional openings is a first hole within one of the first extended areas;
each of the second additional openings is a second hole within one of the second extended areas;
each of the select ones of the first extended areas has a size and shape substantially the same as the second hole; and
each of the select ones of the second extended areas has a size and shape substantially the same as the first hole.

26. The touch device of claim 23, wherein:
each of the first additional openings is a first notch within one of the first extended areas;
each of the second additional openings is a second notch within one of the second extended areas;
each of the select ones of the first extended areas at least partially resides within the corresponding second notch; and
each of the select ones of the second extended areas at least partially resides within the corresponding first notch.

27. The touch device of claim 14, wherein:
the first conductor is one of a plurality of primary conductors aligned in the first direction and the second conductor is one a plurality of secondary conductors aligned in the second direction;
each of the plurality of primary conductors includes a respective plurality of primary areas;
each of the plurality of secondary conductors includes a respective plurality of secondary areas;
each of the plurality of secondary conductors includes respective extended areas; and
the respective extended areas between adjacent secondary conductors of the plurality of secondary conductors are interleaved.

28. The touch device of claim 27, wherein:
each of the plurality of primary conductors includes respective extended first areas; and
the respective extended first areas between adjacent primary conductors of the plurality of primary conductors are interleaved.

29. The touch device of claim 14, wherein the first conductor and the second conductor are implemented on a common plane.

30. The touch device of claim 29, wherein:
the plurality of first areas are connected via traces; and
the plurality of second areas are connected via bond wires.

31. A capacitive touch sensor pattern, comprising:
a plurality of parallel first conductors, each including a plurality of first areas that are electrically coupled to one another along a first direction and separate from one another, at least one of the plurality of first areas within at least one of the plurality of first conductors being a shaped area having a different shape from a shape of the other first areas of the at least one of the plurality of first conductors by having an opening within the shaped area;
a plurality of parallel second conductors, each including a plurality of second areas that are electrically coupled to one another along a second direction other than the first direction and separate from one another, at least one of the plurality of second conductors including a complementary extended area coupled to the plurality of second areas of the at least one of the plurality of second conductors and complementarily aligned with the opening of the shaped area;
a plurality of first extended areas extending from each of the plurality of parallel first conductors in the second direction such that the plurality of first extended areas are interlaced with first conductors of the plurality of first conductors; and
a plurality of second extended areas extending from each of the plurality of parallel second conductors in the first direction such that the plurality of second extended areas are interlaced with second conductors of the plurality of second conductors.

* * * * *